United States Patent
Bennett et al.

(10) Patent No.: US 10,145,681 B2
(45) Date of Patent: Dec. 4, 2018

(54) BRILLOUIN-BASED DISTRIBUTED BEND FIBER SENSOR AND METHOD FOR USING SAME

(71) Applicant: Corning Incorporated, Corning, NY (US)

(72) Inventors: Kevin Wallace Bennett, Hammondsport, NY (US); Ming-Jun Li, Horseheads, NY (US); Shenping Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/646,820

(22) Filed: Jul. 11, 2017

(65) Prior Publication Data

US 2018/0023948 A1    Jan. 25, 2018

Related U.S. Application Data

(60) Provisional application No. 62/364,012, filed on Jul. 19, 2016.

(51) Int. Cl.
| | |
|---|---|
| *G01B 11/255* | (2006.01) |
| *G01B 11/26* | (2006.01) |
| *G01K 11/32* | (2006.01) |
| *G01L 1/24* | (2006.01) |
| *G01D 5/353* | (2006.01) |

(52) U.S. Cl.
CPC ............ *G01B 11/255* (2013.01); *G01B 11/26* (2013.01); *G01D 5/35361* (2013.01); *G01K 11/32* (2013.01); *G01L 1/242* (2013.01); *G01K 2011/322* (2013.01)

(58) Field of Classification Search
None
See application file for complete search history.

(56) References Cited

U.S. PATENT DOCUMENTS

| | | |
|---|---|---|
| 5,633,494 A | 5/1997 | Danisch |
| 7,772,541 B2 | 8/2010 | Froggatt et al. |
| 7,781,724 B2 | 8/2010 | Childers et al. |
| 8,183,520 B2 | 5/2012 | Prisco |

(Continued)

FOREIGN PATENT DOCUMENTS

| | | |
|---|---|---|
| CN | 202372282 U | 8/2012 |
| CN | 103162880 A | 6/2013 |

(Continued)

OTHER PUBLICATIONS

International Search Report and Written Opinion PCT/US2017/042068 dated Oct. 26, 2017.

(Continued)

*Primary Examiner* — Sung Pak
(74) *Attorney, Agent, or Firm* — John P. McGroarty; Kevin L. Bray

(57) ABSTRACT

A Brillouin-based distributed bend fiber sensor and method for using the Brillouin-based distributed bend fiber sensor are described herein. In one example, the Brillouin-based distributed bend fiber sensor is specially configured to measure a temperature distribution ($\Delta T$), a bend angle $\beta$, and a bend radius R along a deployed fiber (e.g., four-core fiber).

21 Claims, 11 Drawing Sheets

(56) References Cited

U.S. PATENT DOCUMENTS

| | | |
|---|---|---|
| 8,265,431 B2 | 9/2012 | Childers et al. |
| 8,335,405 B2 | 12/2012 | Askins |
| 8,614,795 B2 | 12/2013 | Duncan et al. |
| 8,630,515 B2 | 1/2014 | Childers et al. |
| 2006/0013523 A1 | 1/2006 | Childers et al. |
| 2007/0065077 A1 | 3/2007 | Childers et al. |
| 2008/0212082 A1 | 9/2008 | Froggatt et al. |
| 2010/0099951 A1 | 4/2010 | Laby et al. |
| 2010/0158433 A1 | 6/2010 | Askins |
| 2011/0109898 A1 | 5/2011 | Froggatt et al. |
| 2011/0110620 A1 | 5/2011 | Childers et al. |
| 2011/0113852 A1 | 5/2011 | Prisco |
| 2012/0314988 A1 | 12/2012 | Childers et al. |
| 2015/0029511 A1 | 1/2015 | 'T Hooft et al. |
| 2015/0114130 A1 | 4/2015 | White et al. |
| 2016/0018245 A1* | 1/2016 | Yamate ............ G02B 6/02042 250/227.14 |
| 2016/0258743 A1* | 9/2016 | Yao ................. G01B 11/161 |

FOREIGN PATENT DOCUMENTS

| | | |
|---|---|---|
| CN | 202994341 U | 6/2013 |
| CN | 103439766 A | 12/2013 |
| JP | 2016102689 A | 6/2016 |
| KR | 2010006704 A | 1/2010 |

OTHER PUBLICATIONS

Sun et al. "A multicore optical fiber for distributed sensing" Proceedings SPIE Electronic Imaging, 2014. vol. 9098 (2014) 6 pgs.

Askins et al; "Bend and Twist Sensing in a Multiple-Core Optical Fiber"; Conference on Optical Fiber Communication/National Fiber Optic Engineers Conference 2008; 3 Pages.

Burnett, J.G. et. al., "Optical fibre-based vectoral shape sensor" Strain, v 36, n 3, p. 127-133, 2000. Abstract Only.

Jones et al; "Bragg Gratings in Multicore Optical Fibers for Sensor Applications Optics", Infobase Conference Papers, 2007; 3 Pages.

Marcuse; "Influence of Curvature on the Losses of Doubly Clad Fibers"; Applied Optics; vol. 21, No. 23; Dec. 1, 1982; pp. 4208-4213.

Miller et al; "Shape Sensing Using Distributed Fiber Optic Strain Measurements"; Proceedings of the SPIE—The International Society for Optical Engineering; vol. 5502, pp. 528-531, 2004.

Moore et al; "Photogrammetric Verification of Fiber Optic Shape Sensors on Flexible Aerospace Structures"; 2012 IEEE Avionics, Fiber-Optics and Photonics Technology Conference (AVFOP 2012), 978-1-4577-0757-5, Sep. 10, 2012; 2 Pages.

Nasilowski et al. "Sensing applications of photonic crystal fibres" Proceedings of SPIE—Lightguides and Their Applications III, Proceedings of SPIE—The International Society for Optical Engineering, v 6608, 2007, Lightguides and Their Applications III. 17 pgs.

Waltermann et al; "Femtosecond Laser Processing of Evanescence Field Coupled Waveguides in Single Mode Glass Fibers for Optical 3D Shape Sensing and Navigation"; Proceedings of the SPIE; vol. 9480, 948011-1-948011-8; 2015.

Westbrook et al. "Integrated optical fiber shape sensor modules based on twisted multcore fiber grating arrays" Proc. of SPIE vol. 8938, 2014. Optical Fibers and Sensors for Medical Diagnostics and Treatment Applications XIV. 8 pgs.

Westbrook et al; "Integrated Optical Fiber Shape Sensor Modules Based on Twisted Multicore Fiber Grating Arrays", Proceedings of the SPIE—Progress in Biomedical Optics and Imaging; V 8938, 89380H 7 Pages; 2014.

Westbrook et al; "Multicore Optical Fiber Grating Array Fabrication for Medical Sensing Applications"; Proceedings of SPIE; vol. 9317, 93170C-1-93170C-4; 2015.

Wu et al; "Graphene-Based D-Shaped Fiber Multicore Mode Interferometer for Chemical Gas Sensing"; Optics Letters; vol. 39, No. 20; pp. 6030-6033, 2014.

Zetterlund et al; "Fiber for Interferometry and Sensing Applications"; Jounral of Sensors; Article ID 196380; pp. 1-7; 2009.

* cited by examiner

BRILLOUIN-BASED DISTRIBUTED BEND FIBER SENSOR AND METHOD FOR USING SAME

This application claims the benefit of priority under 35 U.S.C. § 119 of U.S. Provisional Application Ser. No. 62/364,012 filed on Jul. 19, 2016 the content of which is relied upon and incorporated herein by reference in its entirety.

TECHNICAL FIELD

The present disclosure relates to a Brillouin-based distributed bend fiber sensor and method for using the Brillouin-based distributed bend fiber sensor to measure a temperature distribution ($\Delta T$), a bend angle $\beta$, and a bend radius R along a deployed fiber (e.g., four-core fiber).

BACKGROUND

Fiber optic sensors which measure strain and temperature over very long distances are rapidly being adopted for use in many applications, such as, for example, structural health monitoring (SHM), geotechnical engineering (e.g., monitoring catastrophic land slippage), power line monitoring, pipe line monitoring, oil drill monitoring, bridge monitoring, dam monitoring, and border security monitoring. An improved fiber optic sensor and a method for using the improved fiber optic sensor to measure strain and temperature are the subject of the present disclosure.

SUMMARY

A Brillouin-based distributed bend fiber sensor and a method for using the Brillouin-based distributed bend fiber sensor are described in the independent claims of the present disclosure. Advantageous embodiments of the Brillouin-based distributed bend fiber sensor and the method for using the Brillouin-based distributed bend fiber sensor are described in the dependent claims.

In one aspect, the present disclosure provides a Brillouin-based distributed fiber sensor. The Brillouin-based distributed fiber sensor comprises a fiber having a first core, a second core, a third core, and a fourth core, wherein the first core, the second core, and the third core are located at three different positions along a circular path within the fiber, wherein the circular path has a radius (r) to a center of the fiber, and wherein the fourth core is located at the center of the fiber. The Brillouin-based distributed fiber sensor further comprises a Brillouin backscattering sensing mechanism which is coupled to the first core, the second core, the third core, and the fourth core. The Brillouin-based distributed fiber sensor can comprise a processing system which is configured to: (a) obtain, prior to deployment of the fiber when the fiber has no bend applied thereto, from the Brillouin backscattering mechanism a first Brillouin frequency shift (BFS) baseline measurement ($v_{B1}$) along the first core, a second BFS baseline measurement ($v_{B2}$) along the second core, a third BFS baseline measurement ($v_{B3}$) along the third core, and a fourth BFS baseline measurement ($v_{B4}$) along the fourth core; (b) obtain, after deployment of the fiber and when there is a bend applied to the fiber, from the Brillouin backscattering mechanism a first BFS bend measurement ($v'_{B1}$) along the first core, a second BFS bend measurement ($v'_{B2}$) along the second core, a third BFS bend measurement ($v'_{B3}$) along the third core, and a fourth BFS bend measurement ($v'_{B4}$) along the fourth core; (c) calculate a change of a first, second, third, and fourth BFS distribution ($\Delta v_{B1}$, $\Delta v_{B2}$, $\Delta v_{B3}$, $\Delta v_{B4}$) respectively along the first, second, third, and fourth cores; (d) calculate a temperature distribution ($\Delta T$) along the deployed fiber; (e) calculate a first, second, and third bend induced strain distributions ($\Delta \varepsilon_1$, $\Delta \varepsilon_2$, $\Delta \varepsilon_3$,) respectively along the first, second, and third cores; (f) calculate a bend angle $\beta$ along the deployed fiber; and (g) calculate a bend radius R along the deployed fiber.

In another aspect, the present disclosure provides a method for using a Brillouin-based distributed fiber sensor comprising: a fiber having a first core, a second core, a third core, and a fourth core, wherein the first core, the second core, and the third core are located at three different positions along a circular path within the fiber, wherein the circular path has a radius (r) to a center of the fiber, and wherein the fourth core is located at the center of the fiber; and, a Brillouin backscattering sensing mechanism coupled to the first core, the second core, the third core, and the fourth core. The method comprising the steps of: (a) obtaining, prior to deployment of the fiber when the fiber has no bend applied thereto, from the Brillouin backscattering mechanism a first Brillouin frequency shift (BFS) baseline measurement ($v_{B1}$) along the first core, a second BFS baseline measurement ($v_{B2}$) along the second core, a third BFS baseline measurement ($v_{B3}$) along the third core, and a fourth BFS baseline measurement ($v_{B4}$) along the fourth core; (b) obtaining, after deployment of the fiber and when there is a bend applied to the fiber, from the Brillouin backscattering mechanism a first BFS bend measurement ($v'_{B1}$) along the first core, a second BFS bend measurement ($v'_{B2}$) along the second core, a third BFS bend measurement ($v'_{B3}$) along the third core, and a fourth BFS bend measurement ($v'_{B4}$) along the fourth core; (c) calculating a change of a first, second, third, and fourth BFS distribution ($\Delta v_{B1}$, $\Delta v_{B2}$, $\Delta v_{B3}$, $\Delta v_{B4}$) respectively along the first, second, third, and fourth cores; (d) calculating a temperature distribution ($\Delta T$) along the deployed fiber; (e) calculating a first, second, and third bend induced strain distributions ($\Delta \varepsilon_1$, $\Delta \varepsilon_2$, $\Delta \varepsilon_3$,) respectively along the first, second, and third cores; (f) calculating a bend angle $\beta$ along the deployed fiber; and (g) calculating a bend radius R along the deployed fiber.

Additional aspects of the disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

A more complete understanding of the present disclosure may be had by reference to the following detailed description when taken in conjunction with the accompanying drawings wherein.

DETAILED DESCRIPTION

Figure 1A:
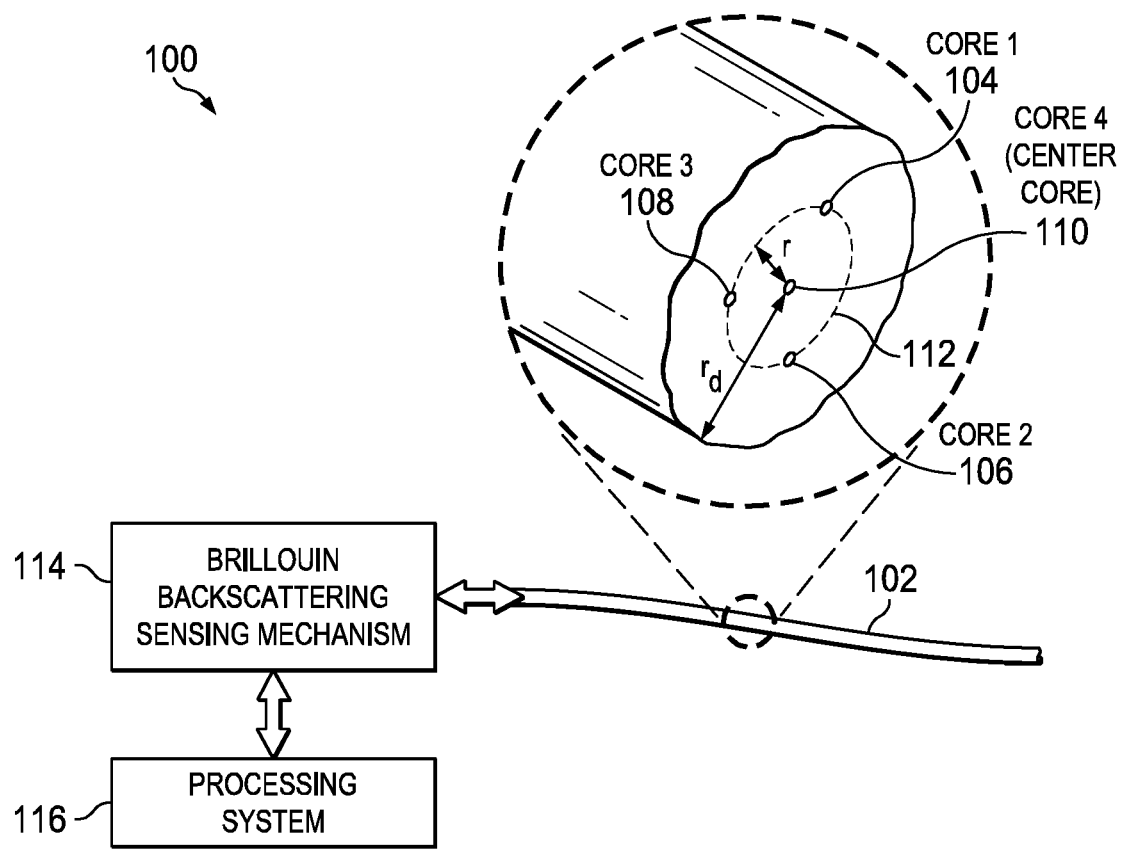
FIG. 1A is a diagram illustrating the basic components of a Brillouin-based distributed bend fiber sensor in accordance with an embodiment of the present disclosure.

Referring to FIG. 1A, there is a diagram illustrating the basic components of a Brillouin-based distributed bend fiber sensor 100 in accordance with an embodiment of the present disclosure. The Brillouin-based distributed bend fiber sensor 100 includes a fiber 102, a Brillouin backscattering sensing mechanism 114, and a processing system 116. In one example, the fiber 102 has a circular shape with a clad radius of $r_d$ and includes a first core 104 (core 1), a second core 106 (core 2), a third core 108 (core 3), and a fourth core 110 (core 4) (see expanded view). The first core 104, the second core 106, and the third core 108 are located at three different positions along a circular path 112 which has a radius r to a center of the fiber 102. The fourth core 110 is located at the center of the fiber 102. In one example shown in FIG. 1B, the Brillouin-based distributed bend fiber sensor 100 is based on Brillouin Optical Time Domain Reflectometry (BOTDR) where it has a BOTDR Brillouin backscattering sensing mechanism 114' which has a channel 1, a channel 2, a channel 3, and a channel 4 respectively coupled via a fan-out device 208 to the first core 104, the second core 106, the third core 108, and the fourth core 110 of the fiber 102 (e.g., see also FIGS. 2, 3A, and 3B). In another example shown in FIG. 1C, the Brillouin-based distributed bend fiber sensor 100 is based on Brillouin Optical Time Domain Analysis (BOTDA) where it has a BOTDA Brillouin backscattering sensing mechanism 114" which has a channel 1 and a channel 2 respectively coupled via a first fan-out device 410 to the first and second cores 104 and 106 (channel 1), and the third and fourth cores 108 and 110 (channel 2) of the fiber 102. In addition, the Brillouin-based distributed bend fiber sensor 100 with the BOTDA Brillouin backscattering sensing mechanism 114" has a second fan-out device 414 which couples the first and second cores 104 and 106, and the third and fourth cores 108 and 110 at the end of the fiber 102 (e.g., see also FIGS. 4-5).

Prior to describing in detail the various BOTDR and BOTDA based Brillouin-based distributed bend fiber sensors 100 which are associated with the present disclosure, a brief discussion is provided first to explain the basic operating principle of a conventional Brillouin-based distributed bend fiber sensor that has only one core (one channel).

Principle of Distributed Brillouin Sensors

Conventional distributed Brillouin sensors with a single core (one channel) are based on Brillouin scattering which is inelastically scattered light with acoustic phonons that undergo a frequency shift (known as Brillouin frequency shift) during collision with the fiber. This Brillouin frequency shift (BFS) becomes a maximum when the light is backscattered and is represented by:

$$v_B = \frac{2nV_a}{\lambda} \quad (1)$$

where n is the index of refraction, $V_a$ is the velocity of sound, and $\lambda$ is the light wavelength. It has been found that Brillouin frequency shift (BFS) increases linearly with strain and temperature applied to the fiber. So, the change of BFS ($\Delta v_B$) depends on both strain variation ($\Delta\varepsilon$) and temperature variation ($\Delta T$). The BFS ($\Delta v_B$) can be written as:

$$\Delta v_B = K_\varepsilon \Delta\varepsilon + K_T \Delta T \quad (2)$$

wherein $K_\varepsilon$ and $K_T$ are the strain and temperature coefficients of BFS, respectively. Thus, the change of temperature or strain in a fiber can be measured by analyzing the change of BFS. However, since the Brillouin frequency shift is a function of both temperature and strain, a problem common with many distributed Brillouin fiber sensors is that one cannot distinguish a change in the strain or the temperature experienced by the fiber. This problem is solved by the Brillouin-based distributed bend fiber sensors 100 associated with the present disclosure.

From a general point of view, distributed Brillouin fiber sensors can be classified as being one of two main kinds: (1) Brillouin optical time domain Reflectometry (BOTDR) which utilizes spontaneous Brillouin scattering; and (2) Brillouin optical time domain analysis (BOTDA) which is based on stimulated Brillouin scattering.

In BOTDR, only a pulsed-optical wave (pump) is launched into the optical fiber and there is not any additional stimulus on the phonon generation, and the power of the pump wave is lower than stimulated Brillouin scattering threshold. To obtain the distributed strain, which is the distributed $v_B$ along an optical fiber, the BOTDR observes the distribution of the Brillouin backscattering light spectra along the optical fiber by utilizing a OTDR technique. Briefly, the OTDR technique is as follows: a series of optical pulses are injected into one end of the fiber under test and light that is scattered or reflected back from points along the fiber is extracted from the same end of the fiber. The scattered or reflected light at a specific location includes the information to be measured, such as loss, temperature. By measuring the light scattered at different times, the information to be measured along the fiber can be obtained.

BOTDA uses Brillouin gain (or loss) spectroscopy in which a pulsed-optical wave (pump) and a counter-propagating light (probe), which is normally a continuous wave, are both injected into the optical fiber. When the frequency difference between the pulsed light and the continuous light is tuned to the Brillouin frequency $v_B$ of the fiber, the continuous light is amplified through the stimulated Brillouin scattering process; that is, the increasing continuous light is measured as function of time, like with the OTDR technique.

New Brillouin-Based Distributed Bend Fiber Sensors 100

Figure 1B:
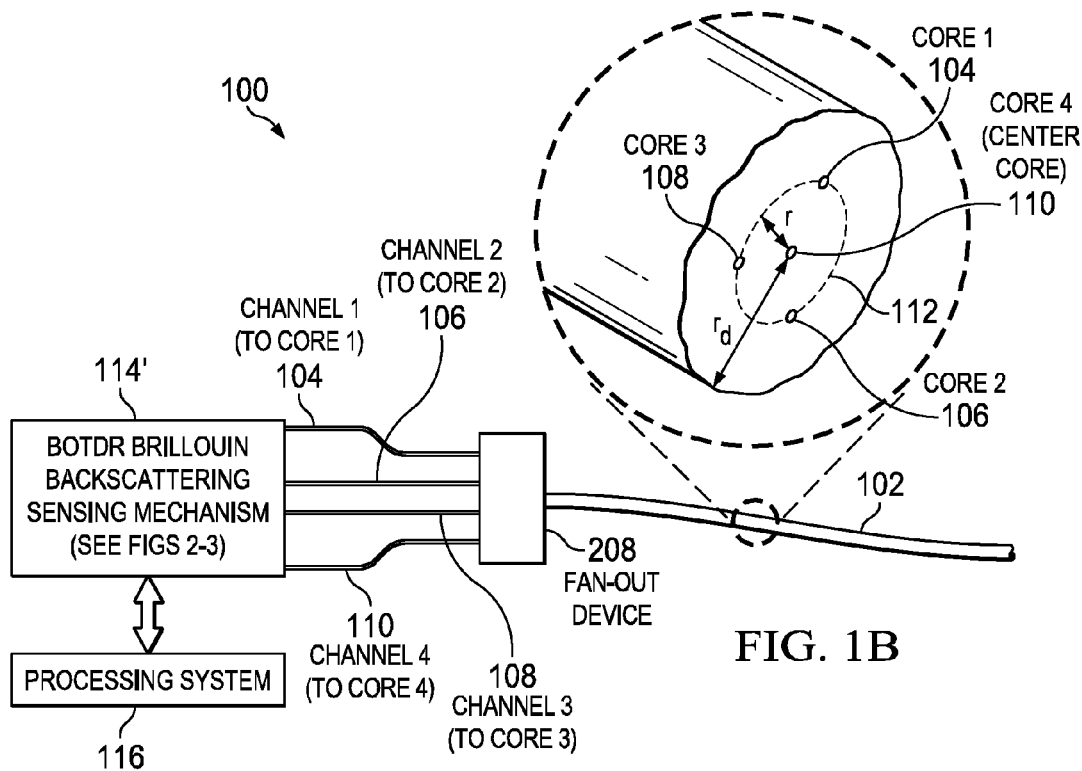
FIG. 1B is a diagram of a Brillouin-based distributed bend fiber sensor based on Brillouin Optical Time Domain Reflectometry (BOTDR) in accordance with an embodiment of the present disclosure.
Figure 1C:
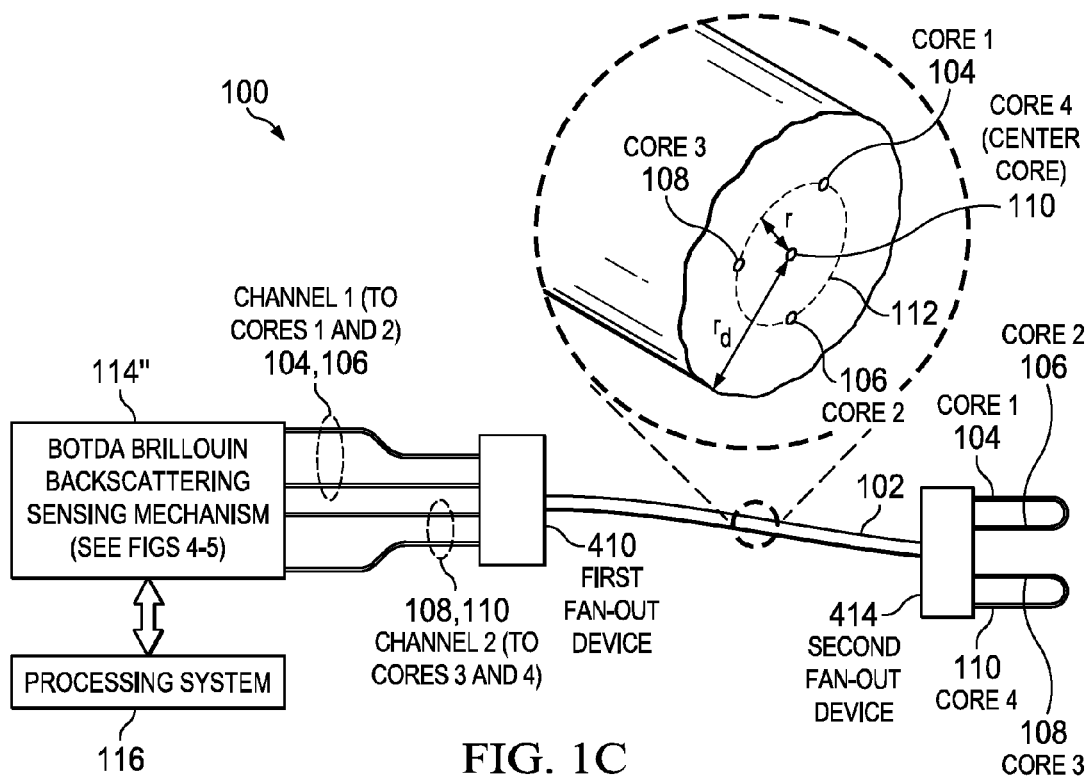
FIG. 1C is a diagram of a Brillouin-based distributed bend fiber sensor 100 is based on Brillouin Optical Time Domain Analysis (BOTDA) in accordance with an embodiment of the present disclosure.

Several new Brillouin-based distributed bend fiber sensors 100 have been illustrated schematically in FIGS. 1A-1C. In these Brillouin-based distributed bend fiber sensors 100, a four-core optical fiber 102 is used as a sensing medium to enable simultaneous bend and temperature measurements. Each fiber core 104, 106, 108 and 110 is single mode at the operation wavelength of the Brillouin sensor 100, and performs as an independent sensing medium.

Referring again to FIG. 1B, the BOTDR Brillouin-based distributed bend fiber sensor 100 has four sensing channels 1, 2, 3, and 4 which correspond to cores 1, 2, 3, and 4 in the fiber 102 whereas the conventional BOTDR Brillouin-based distributed bend fiber sensor has only one channel which corresponds to a single core fiber. The BOTDR Brillouin-based distributed bend fiber sensor 100 is based on BOTDR where pump pulses are launched into each core 1, 2, 3, and 4 (or channel 1, 2, 3, and 4) of the four-core fiber 102 through the fan-out device 208, and the Brillouin backscattering lights of each core 1, 2, 3, and 4 which include temperature and strain information at different locations are collected through the fan-out device 208 and analyzed by the processing system 116. More specifically, the bend introduced strains in cores 1, 2 and 3 are measured by channels 1, 2, and 3, while the fiber temperature is measured by core 4 which is monitored by channel 4. The wavelength of pump pulses for each core 1, 2, 3, and 4 (or channel 1, 2, 3, and 4) can be either the same or different. But, the wavelength of the pump pulses of core 4 (channel 4) can be different from the wavelengths of the other cores 1, 2, and 3 (or channels 1, 2, and 3) to minimize the cornstalk between core 4 (channel 4) and cores 1, 2, and 3 (channels 1, 2 and 3). Two exemplary BOTDR Brillouin-based distributed bend fiber sensors 100a and 100b are described in detail below with respect to FIGS. 2, 3A, and 3B.

Figure 2:
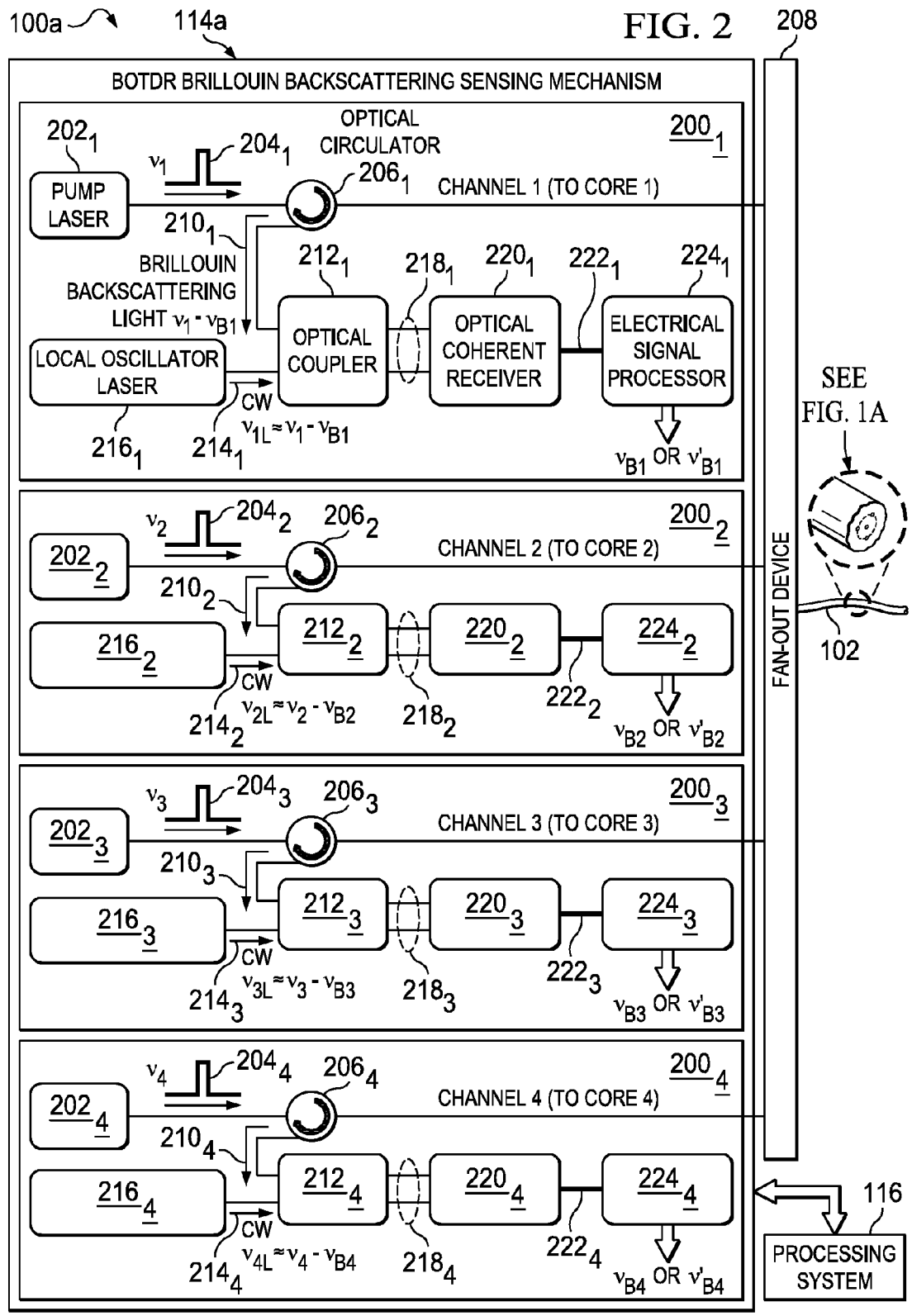
FIG. 2 is a diagram illustrating the components of an exemplary BOTDR Brillouin-based distributed bend fiber sensor in accordance with an embodiment of the present disclosure.

Referring to FIG. 2, there is a diagram illustrating the components of a BOTDR Brillouin-based distributed bend fiber sensor 100a in accordance with an embodiment of the present disclosure. The BOTDR Brillouin-based distributed bend fiber sensor 100a includes the fiber 102, the BOTDR Brillouin backscattering sensing mechanism 114a, the processing system 116, and the fan-out device 208. As shown, the BOTDR Brillouin backscattering sensing mechanism 114a comprises a first, second, third and fourth BOTDR Brillouin backscattering sensing mechanism $200_1$, $200_2$, $200_3$, and $200_4$ which are respectively connected via the fan-out device 208 to the first, second, third and fourth cores 104, 106, 108, and 110 of the fiber 102.

The first BOTDR Brillouin backscattering sensing mechanism $200_1$ comprises a first pump laser $202_1$ which launches pump pulses $204_1$ with a frequency $v_1$ through a first optical circulator $206_1$ and the fan-out device 208 into the first core 104. The Brillouin backscattering light $210_1$ from the first core 104 with a frequency $v_1-v_{B1}$ which is outputted by the first local circulator $206_1$ is mixed by a first optical coupler $212_1$ with a continuous wave light $214_1$ with a fixed frequency $v_{1L} \approx v_1-v_{B1}$ generated by a first local oscillator $216_1$ (e.g., laser $216_1$). A mixed optical signal $218_1$ from the first optical coupler $212_1$ is detected by a first optical coherent receiver $220_1$. Thereafter, an electrical output $222_1$ from the first optical coherent receiver $220_1$ is analyzed by a first electrical signal processor $224_1$ which outputs either (i) a first BFS baseline measurement $v_{B1}$ which is obtained prior to deployment of the fiber 102 when the fiber 102 has no bend applied thereto (see FIG. 10's step 1002), or (ii) a first BFS bend measurement $v'_{B1}$ which is obtained after the deployment of the fiber 102 and there is a bend applied to the fiber 102 (see FIG. 10's step 1004).

The second BOTDR Brillouin backscattering sensing mechanism $200_2$ comprises a second pump laser $202_2$ which launches pump pulses $204_2$ with a frequency $v_2$ through a second optical circulator $206_2$ and the fan-out device 208 into the second core 106. The Brillouin backscattering light $210_2$ from the second core 106 with a frequency $v_2-v_{B2}$ which is outputted by the second local circulator $206_2$ is mixed by a second optical coupler $212_2$ with a continuous wave light $214_2$ with a fixed frequency $v_{2L} \approx v_2-v_{B2}$ generated by a second local oscillator $216_2$ (e.g., laser $216_2$). A mixed optical signal $218_2$ from the second optical coupler $212_2$ is detected by a second optical coherent receiver $220_2$. Thereafter, an electrical output $222_2$ from the second optical coherent receiver $220_2$ is analyzed by a second electrical signal processor $224_2$ which outputs either (i) a second BFS baseline measurement $v_{B2}$ which is obtained prior to deployment of the fiber 102 when the fiber 102 has no bend applied thereto (see FIG. 10's step 1002), or (ii) a second BFS bend measurement $v'_{B2}$ which is obtained after the deployment of the fiber 102 and there is a bend applied to the fiber 102 (see FIG. 10's step 1004).

The third BOTDR Brillouin backscattering sensing mechanism $200_3$ comprises a third pump laser $202_3$ which launches pump pulses $204_3$ with a frequency $v_3$ through a third optical circulator $206_3$ and the fan-out device 208 into the third core 108. The Brillouin backscattering light $210_3$ from the third core 108 with a fixed frequency $v_3-v_{B3}$ which is outputted by the third local circulator $206_3$ is mixed by a third optical coupler $212_3$ with a continuous wave light $214_3$ with a frequency $v_{3L} \approx v_3-v_{B3}$ generated by a third local oscillator $216_3$ (e.g., laser $216_3$). A mixed optical signal $218_3$ from the third optical coupler $212_3$ is detected by a third optical coherent receiver $220_3$. Thereafter, an electrical output $222_3$ from the third optical coherent receiver $220_3$ is analyzed by a third electrical signal processor $224_3$ which outputs either (i) a third BFS baseline measurement $v_{B3}$ which is obtained prior to deployment of the fiber 102 when the fiber 102 has no bend applied thereto (see FIG. 10's step 1002), or (ii) a third BFS bend measurement $v'_{B3}$ which is obtained after the deployment of the fiber 102 and there is a bend applied to the fiber 102 (see FIG. 10's step 1004).

The fourth BOTDR Brillouin backscattering sensing mechanism $200_4$ comprises a fourth pump laser $202_4$ which launches pump pulses $204_4$ with a frequency $v_4$ through a fourth optical circulator $206_4$ and the fan-out device 208 into the fourth core 110. The Brillouin backscattering light $210_4$ from the fourth core 110 with a fixed frequency $v_4-v_{B4}$ which is outputted by the fourth local circulator $206_4$ is mixed by a fourth optical coupler $212_4$ with a continuous wave light $214_4$ with a frequency $v_{4L} \approx v_4-v_{B4}$ generated by a fourth local oscillator $216_4$ (e.g., laser $216_4$). A mixed optical signal $218_4$ from the fourth optical coupler $212_4$ is detected by a fourth optical coherent receiver $220_4$. Thereafter, an electrical output $222_4$ from the fourth optical coherent receiver $220_4$ is analyzed by a fourth electrical signal processor $224_4$ which outputs either (i) a fourth BFS baseline measurement $v_{B4}$ which is obtained prior to deployment of the fiber 102 when the fiber 102 has no bend applied thereto (see FIG. 10's step 1002), or (ii) a fourth BFS bend measurement $v'_{B4}$ which is obtained after the deployment of the fiber 102 and there is a bend applied to the fiber 102 (see FIG. 10's step 1004).

Figure 3A:
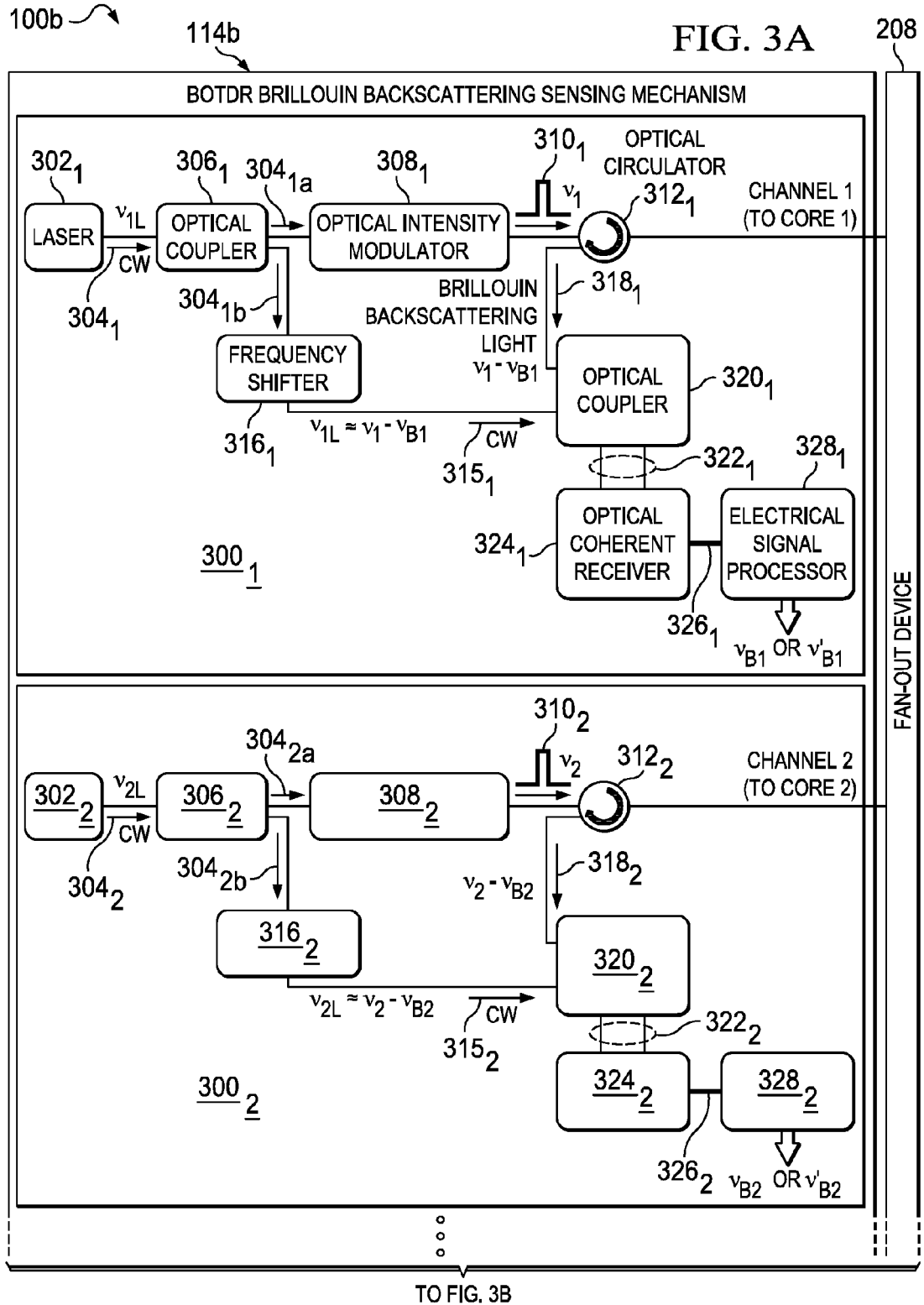
FIGS. 3A-3B is a diagram illustrating the components of another exemplary BOTDR Brillouin-based distributed bend fiber sensor in accordance with an embodiment of the present disclosure.
Figure 3B:
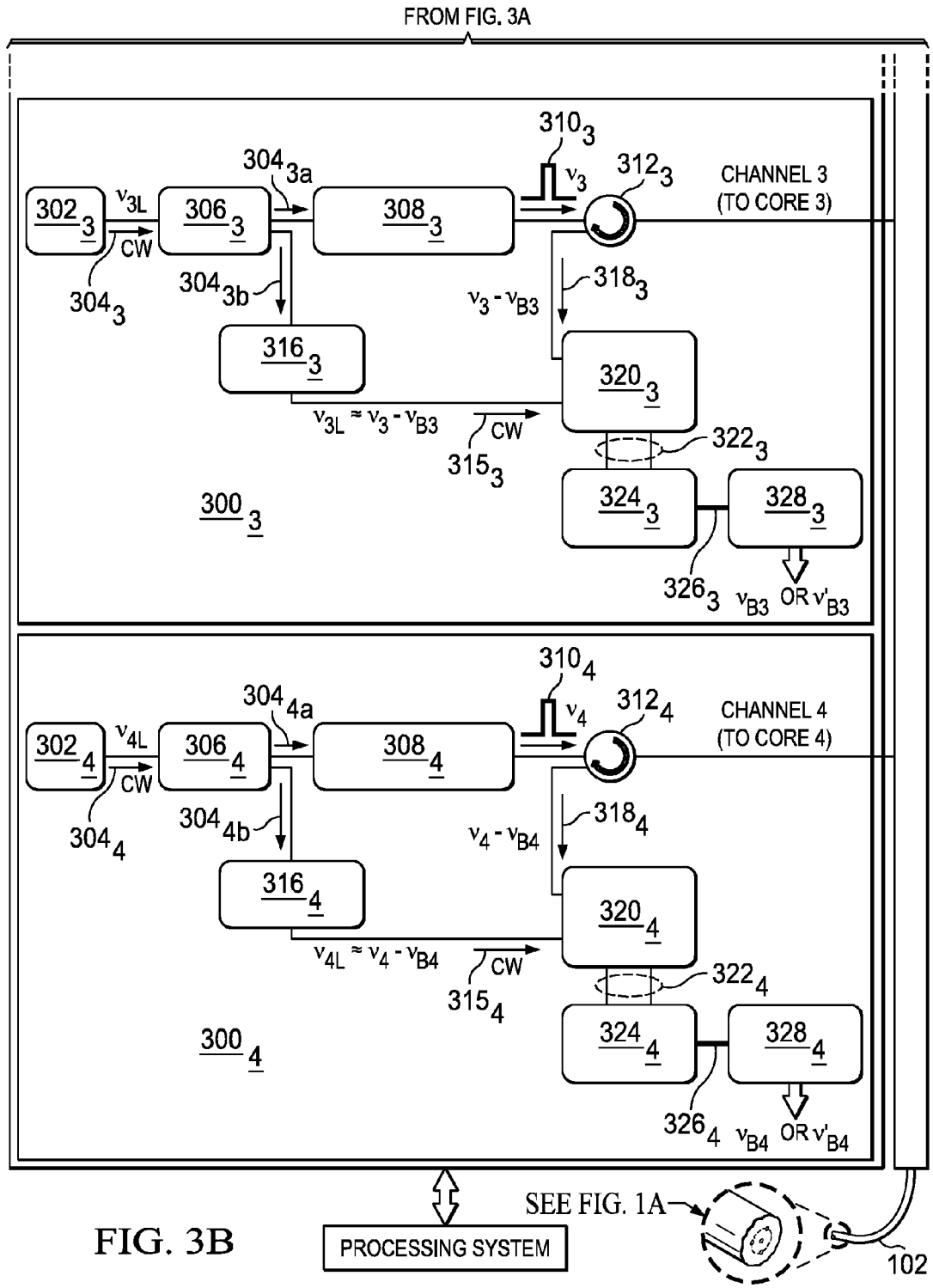

Referring to FIGS. 3A-3B, there is a diagram illustrating the components of a BOTDR Brillouin-based distributed bend fiber sensor 100b in accordance with an embodiment of the present disclosure. The BOTDR Brillouin-based distributed bend fiber sensor 100b includes the fiber 102, the BOTDR Brillouin backscattering sensing mechanism 114b, the processing system 116, and the fan-out device 208. As shown, the BOTDR Brillouin backscattering sensing mechanism 114b comprises a first, second, third and fourth BOTDR Brillouin backscattering sensing mechanism $300_1$, $300_2$, $300_3$, and $300_4$ which are respectively connected via the fan-out device 208 to the first, second, third and fourth cores 104, 106, 108, and 110 of the fiber 102.

The first BOTDR Brillouin backscattering sensing mechanism $300_1$ comprises a first laser $302_1$ which launches a continuous wave light $304_1$ with a frequency $v_{1L}$ to a first optical coupler $306_1$ that splits the continuous wave light $304_1$ into two parts $304_{1a}$ and $304_{1b}$. A first optical intensity modulator $308_1$ converts the one part $304_{1a}$ of the continuous wave light $304_1$ into pump pulses $310_1$ with a frequency $v_1$ which are introduced by a first optical circulator $312_1$ and the fan-out device 208 into the first core 104. A first frequency shifter $316_1$ shifts the frequency $v_{1L}$ of the other part $304_{1b}$ of the continuous wave light $304_1$ to a fixed frequency $v_{1L} \approx v_1 - v_{B1}$. The Brillouin backscattering light $318_1$ from the first core 104 with a frequency $v_1 - v_{B1}$ is mixed by a first optical coupler $320_1$ with the shifted continuous wave light $315_1$ with the fixed frequency provided by the first frequency shifter $316_1$. A mixed optical signal $322_1$ from the first optical coupler $320_1$ is detected by a first optical coherent receiver $324_1$. An electrical output $326_1$ from the first optical coherent receiver $324_1$ is analyzed by a first electrical signal processor $328_1$ which outputs either (i) a first BF baseline measurement $v_{B1}$ which is obtained prior to deployment of the fiber 102 when the fiber 102 has no bend applied thereto (see FIG. 10's step 1002), or (ii) a first BFS bend measurement $v'_{B1}$ which is obtained after the deployment of the fiber 102 and there is a bend applied to the fiber 102 (see FIG. 10's step 1004).

The second BOTDR Brillouin backscattering sensing mechanism $300_2$ comprises a second laser $302_2$ which launches a continuous wave light $304_2$ with a frequency $v_{2L}$ to a second optical coupler $306_2$ that splits the continuous wave light $304_2$ into two parts $304_{2a}$ and $304_{2b}$. A second optical intensity modulator $308_2$ converts the one part $304_{2a}$ of the continuous wave light $304_2$ into pump pulses $310_2$ with a frequency $v_2$ which are introduced by a second optical circulator $312_2$ and the fan-out device 208 into the second core 106. A second frequency shifter $316_2$ shifts the frequency $v_{2L}$ of the other part $304_{2b}$ of the continuous wave light $304_2$ to a fixed frequency $v_{2L} \approx v_2 - v_{B2}$. The Brillouin backscattering light $318_2$ from the second core 106 with a frequency $v_2 - v_{B2}$ is mixed by a second optical coupler $320_2$ with the shifted continuous wave light $315_2$ with the fixed frequency $v_{2L} \approx v_2 - v_{B2}$ provided by the second frequency shifter $316_2$. A mixed optical signal $322_2$ from the second optical coupler $320_2$ is detected by a second optical coherent receiver $324_2$. An electrical output $326_2$ from the second optical coherent receiver $324_2$ is analyzed by a second electrical signal processor $328_2$ which outputs either (i) a second BF baseline measurement $v_{B2}$ which is obtained prior to deployment of the fiber 102 when the fiber 102 has no bend applied thereto (see FIG. 10's step 1002), or (ii) a second BFS bend measurement $v'_{B2}$ which is obtained after the deployment of the fiber 102 and there is a bend applied to the fiber 102 (see FIG. 10's step 1004).

The third BOTDR Brillouin backscattering sensing mechanism $300_3$ comprises a third laser $302_3$ which launches a continuous wave light $304_3$ with a frequency $v_{3L}$ to a third optical coupler $306_3$ that splits the continuous wave light $304_3$ into two parts $304_{3a}$ and $304_{3b}$. A third optical intensity modulator $308_3$ converts the one part $304_{3a}$ of the continuous wave light $304_3$ into pump pulses $310_3$ with a frequency $v_3$ which are introduced by a third optical circulator $312_3$ and the fan-out device 208 into the third core 108. A third frequency shifter $316_3$ shifts the frequency $v_{3L}$ of the other part $304_{3b}$ of the continuous wave light $304_3$ to a fixed frequency $v_{3L} \approx v_3 - v_{B3}$. The Brillouin backscattering light $318_3$ from the third core 108 with a frequency $v_3 - v_{B3}$ is mixed by a third optical coupler $320_3$ with the shifted continuous wave light $315_3$ with the fixed frequency $v_{3L} \approx v_3 - v_{B3}$ provided by the third frequency shifter $316_3$. A mixed optical signal $322_3$ from the third optical coupler $320_3$ is detected by a third optical coherent receiver $324_3$. An electrical output $326_3$ from the third optical coherent receiver $324_3$ is analyzed by a third electrical signal processor $328_3$ which outputs either (i) a third BF baseline measurement $v_{B3}$ which is obtained prior to deployment of the fiber 102 when the fiber 102 has no bend applied thereto (see FIG. 10's step 1002), or (ii) a third BFS bend measurement $v'_{B3}$ which is obtained after the deployment of the fiber 102 and there is a bend applied to the fiber 102 (see FIG. 10's step 1004).

The fourth BOTDR Brillouin backscattering sensing mechanism $300_4$ comprises a fourth laser $302_4$ which launches a continuous wave light $304_4$ with a frequency $v_{4L}$ to a fourth optical coupler $306_4$ that splits the continuous wave light $304_4$ into two parts $304_{4a}$ and $304_{4b}$. A fourth optical intensity modulator $308_4$ converts the one part $304_{4a}$ of the continuous wave light $304_4$ into pump pulses $310_4$ with a frequency $v_4$ which are introduced by a fourth optical circulator $312_4$ and the fan-out device 208 into the fourth core 110. A fourth frequency shifter $316_4$ shifts the frequency $v_{4L}$ of the other part $304_{4b}$ of the continuous wave light $304_4$ to a fixed frequency $v_{4L} \approx v_4 - v_{B4}$. The Brillouin backscattering light $318_4$ from the fourth core 110 with a frequency $v_4 - v_{B4}$ is mixed by a fourth optical coupler $320_4$ with the shifted continuous wave light $315_4$ with the fixed frequency $v_{4L} \approx v_4 - v_{B4}$ provided by the fourth frequency shifter $316_4$. A mixed optical signal $322_4$ from the fourth optical coupler $320_4$ is detected by a fourth optical coherent receiver $324_4$. An electrical output $326_4$ from the fourth optical coherent receiver $324_4$ is analyzed by a fourth electrical signal processor $328_4$ which outputs either (i) a fourth BF baseline measurement $v_{B4}$ which is obtained prior to deployment of the fiber 102 when the fiber 102 has no bend applied thereto (see FIG. 10's step 1002), or (ii) a fourth BFS bend measurement $v'_{B4}$ which is obtained after the deployment of the fiber 102 and there is a bend applied to the fiber 102 (see FIG. 10's step 1004).

Referring again to FIG. 1C, the BOTDA Brillouin-based distributed bend fiber sensor 100 has two channels where channel 1 consists of cores 1 and 2, and channel 2 consists of cores 3 and 4. The BOTDA Brillouin-based distributed bend fiber sensor 100 is based on BOTDA where pump lights and probe lights for each channel 1 (or 2) are launched into cores 1 and 2 (or cores 3 and 4) through the first fan-out device 410 at one end of the fiber 102 while at the other end of the fiber 102 the cores 1 and 2 (or cores 3 and 4) are looped together through another fan-out device 414. The bend introduced strains in cores 1 and 2 are measured by channel 1, and the bend introduced strain in cores 3 and 4 are measured by channel 2 while the fiber temperature is measured by core 4 which is monitored by channel 2. The wavelengths of the pump light and probe light of the channel 1 could be different from the wavelengths of the pump light and probe light of channel 2 to minimize cross-talk between channels 1 and 2. Two exemplary BOTDA Brillouin-based distributed bend fiber sensors 100c and 100d are described in detail below with respect to FIGS. 4-5.

Figure 4:
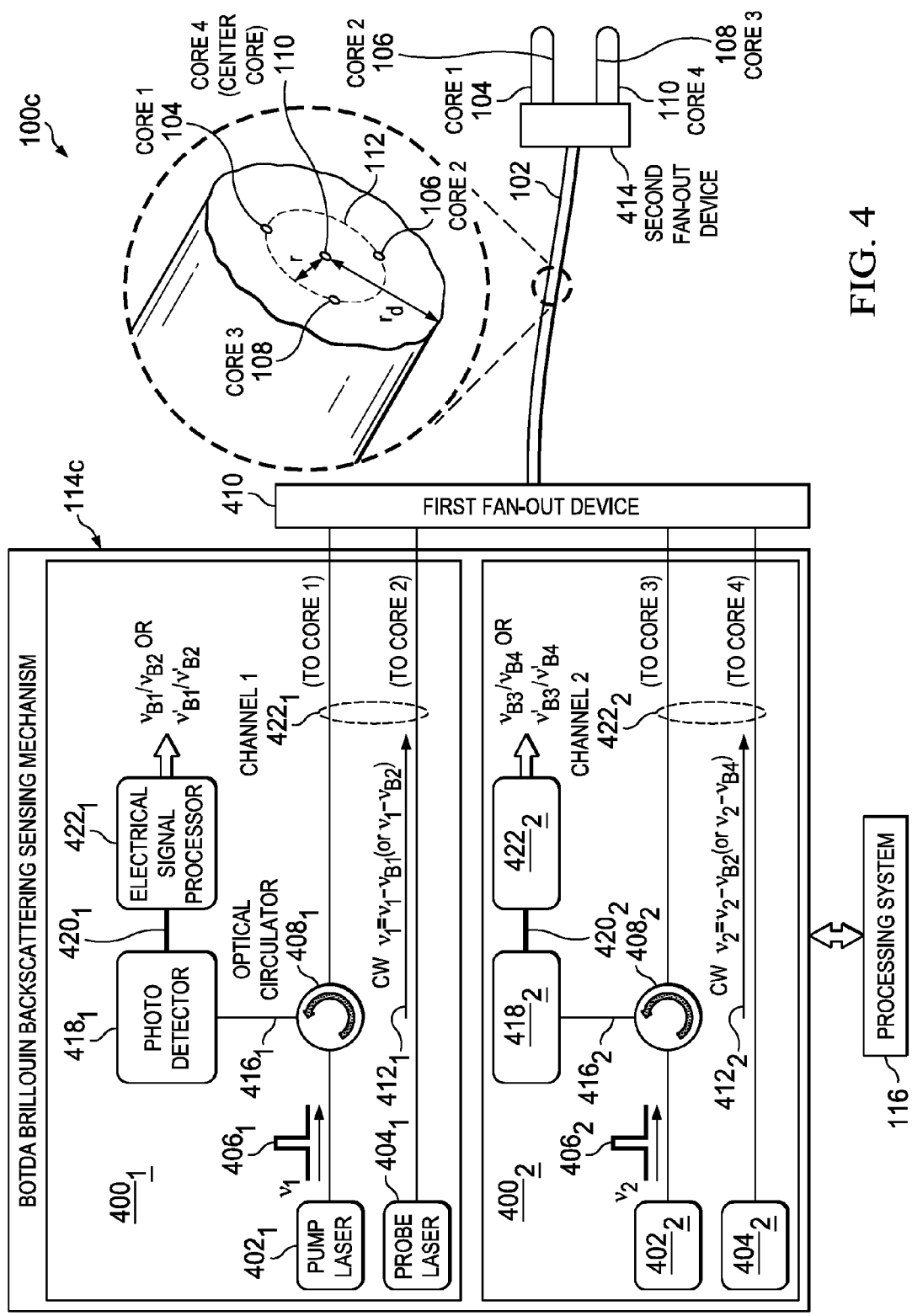
FIG. 4 is a diagram illustrating the components of an exemplary BOTDA Brillouin-based distributed bend fiber sensor in accordance with an embodiment of the present disclosure.

Referring to FIG. 4, there is a diagram illustrating the components of a BOTDA Brillouin-based distributed bend fiber sensor 100c in accordance with an embodiment of the present disclosure. The BOTDA Brillouin-based distributed bend fiber sensor 100c includes the fiber 102, the BOTDA Brillouin backscattering sensing mechanism 114c, the processing system 116, the first fan-out device 410, and the second fan-out device 414. As shown, the BOTDA Brillouin backscattering sensing mechanism 114c comprises a first and second BOTDA Brillouin backscattering sensing mechanism $400_1$ and $400_2$. The first BOTDA Brillouin backscattering sensing mechanism $400_1$ is connected via the first fan-out device 410 to a first end of each of the first and second cores 104 and 106. The second BOTDA Brillouin backscattering sensing mechanism $400_2$ is connected via the first fan-out device 410 to a first end of each of the third and fourth cores 108 and 110. The second fan-out device 414 connects the other ends of the first and second cores 104 and 106 and also connects the other ends of the third and fourth cores 108 and 110.

The first BOTDA Brillouin backscattering sensing mechanism $400_1$ comprises a first pump laser $402_1$ and a first probe laser $404_1$. The first pump laser $402_1$ launches pump pulses $406_1$ with a frequency $v_1$ through a first optical circulator $408_1$ and the first fan-out device 410 into the first core 104. The first probe laser $404_1$ launches a continuous wave light $412_1$ with a frequency $v_{1L} \approx v_1 - v_{B1}$ (or $v_1 - v_{B2}$) through the first fan-out device 410 into the second core 106. A probe signal $416_1$ is detected by a first photo detector $418_1$ that is coupled to the first optical circulator $408_1$. An electrical signal $420_1$ output by the first photo detector $418_1$ is analyzed by a first electrical signal processor $422_1$ which outputs either (i) a first BFS baseline measurement $v_{B1}$ (associated with the first core 104) and a second BFS baseline measurement $v_{B2}$ (associated with the second core 106) which are obtained prior to deployment of the fiber 102 when the fiber 100 has no bend applied thereto (see FIG. 10's step 1002), or (ii) a first BFS bend measurement $v'_{B1}$ (associated with the first core 104) and a second BFS bend measurement $v'_{B2}$ (associated with the second core 106) which are obtained after the deployment of the fiber 102 and there is a bend applied to the fiber 102 (see FIG. 10's step 1004).

The second BOTDA Brillouin backscattering sensing mechanism $400_2$ comprises a second pump laser $402_2$ and a second probe laser $404_2$. The second pump laser $402_2$ launches pump pulses $406_2$ with a frequency ($v_2$) through a second optical circulator $408_2$ and the first fan-out device 410 into the third core 108. The second probe laser $404_2$ launches a continuous wave light $412_2$ with a frequency ($v_{2L} \approx v_2 - v_{B3}$ (or $v_2 - v_{B4}$)) through the first fan-out device 410 into the fourth core 110. A probe signal $416_2$ is detected by a second photo detector $418_2$ that is coupled to the second optical circulator $408_2$. An electrical signal $420_2$ output by the second photo detector $418_2$ is analyzed by a second electrical signal processor $422_2$ which outputs either (i) a third BFS baseline measurement $v_{B3}$ (associated with the third core 108) and a fourth BFS baseline measurement $v_{B4}$ (associated with the fourth core 110) which are obtained prior to deployment of the fiber 102 when the fiber 102 has no bend applied thereto (see FIG. 10's step 1002), or (ii) a third BFS bend measurement $v'_{B3}$ (associated with the third core 108) and a fourth BFS bend measurement $v'_{B4}$ (associated with the fourth core 110) which are obtained after the deployment of the fiber 102 and there is a bend applied to the fiber 102 (see FIG. 10's step 1004).

Figure 5:
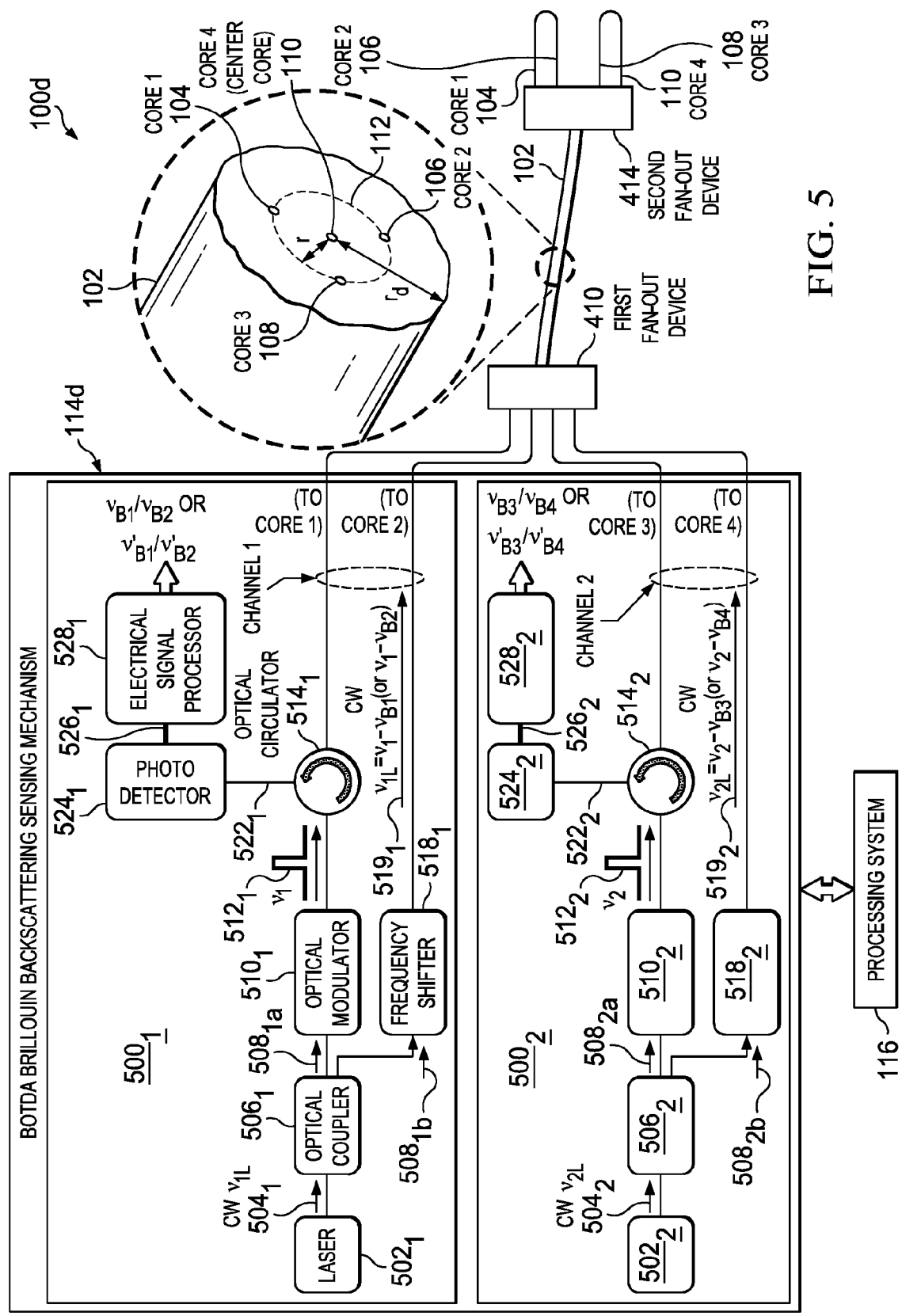
FIG. 5 is a diagram illustrating the components of another exemplary BOTDA Brillouin-based distributed bend fiber sensor in accordance with an embodiment of the present disclosure.

Referring to FIG. 5, there is a diagram illustrating the components of a BOTDA Brillouin-based distributed bend fiber sensor 100d in accordance with an embodiment of the present disclosure. The BOTDA Brillouin-based distributed bend fiber sensor 100d includes the fiber 102, the BOTDA Brillouin backscattering sensing mechanism 114d, the processing system 116, the first fan-out device 410, and the second fan-out device 414. As shown, the BOTDA Brillouin backscattering sensing mechanism 114d comprises a first and second BOTDA Brillouin backscattering sensing mechanism $500_1$ and $500_2$. The first BOTDA Brillouin backscattering sensing mechanism $500_1$ is connected via the first fan-out device 410 to a first end of each of the first and second cores 104 and 106. The second BOTDA Brillouin backscattering sensing mechanism $500_2$ is connected via the first fan-out device 410 to a first end of each of the third and fourth cores 108 and 110. A second fan-out device 414 connects the other ends of the first and second cores 104 and 106 and also connects the other ends of the third and fourth cores 108 and 110.

The first BOTDA Brillouin backscattering sensing mechanism $500_1$ comprises a first laser $502_1$ which launches a continuous wave light $504_1$ with a frequency $v_{1L}$ to a first optical coupler $506_1$ that splits the continuous wave light $504_1$ into two parts $508_{1a}$ and $508_{1b}$. A first optical modulator $510_1$ converts the one part $508_{1a}$ of the continuous wave light $504_1$ into pump pulses $512_1$ with a frequency $v_1$ which is introduced by a first optical circulator $514_1$ and the first fan-out device 410 into the first core 104. A first frequency shifter $518_1$ shifts the frequency $v_{1L}$ of the other part $508_{1b}$ of the continuous wave light $504_1$ to a frequency $v_{1L} \approx v_1 - v_{B1}$ (or $v_1 - v_{B2}$) where the shift continuous wave light $519_1$ is introduced by the first fan-out device 410 into the second core 106. A probe signal $522_1$ is detected by a first photo detector $524_1$ that is coupled to the first optical circulator $514_1$. An electrical signal $526_1$ output by the first photo detector $524_1$ is analyzed by a first electrical signal processor $528_1$ which outputs either (i) a first BFS baseline measurement $v_{B1}$ (associated with the first core 104) and a second BFS baseline measurement $v_{B2}$ (associated with the second core 106) which are obtained prior to deployment of the fiber 102 when the fiber 102 has no bend applied thereto (see FIG. 10's step 1002) or (ii) a first BFS bend measurement $v'_{B1}$ (associated with the first core 104) and a second BFS bend measurement $v'_{B2}$ (associated with the second core 106) which are obtained after the deployment of the fiber 102 and there is a bend applied to the fiber 102 (see FIG. 10's step 1004).

The second BOTDA Brillouin backscattering sensing mechanism $500_2$ comprises a second laser $502_2$ which launches a continuous wave light $504_2$ with a frequency $v_{2L}$ to a second optical coupler $506_2$ that splits the continuous wave light $504_2$ into two parts $508_{2a}$ and $508_{2b}$. A second optical modulator $510_2$ converts the one part $508_{2a}$ of the continuous wave light $504_2$ into pump pulses $512_2$ with a frequency $v_2$ which is introduced by a second optical circulator $514_2$ and the first fan-out device 410 into the third core 108. A second frequency shifter $518_2$ shifts the frequency $v_{2L}$ of the other part $508_{2b}$ of the continuous wave light $504_2$ to a frequency $v_{2L} \approx v_2 - v_{B3}$ (or $v_2 - v_{B4}$) where the shift continuous wave light $519_2$ is introduced by the first fan-out device 410 into the fourth core 110. A probe signal $522_2$ is detected by a second photo detector $524_2$ that is coupled to the second optical circulator $514_2$. An electrical signal $526_2$ output by the second photo detector $524_2$ is analyzed by a second electrical signal processor $528_2$ which outputs either (i) a third BFS baseline measurement $v_{B3}$ (associated with the third core 108) and a fourth BFS baseline measurement $v_{B4}$ (associated with the fourth core 110) which are obtained prior to deployment of the fiber 102 when the fiber 102 has no bend applied thereto (see FIG. 10's step 1002), or (ii) a third BFS bend measurement $v'_{B3}$ (associated with the third core 108) and a fourth BFS bend measurement $v'_{B4}$ (associated with the fourth core 110) which are obtained after the deployment of the fiber 102 and there is a bend applied to the fiber 102 (see FIG. 10's step 1004).

Figure 6:
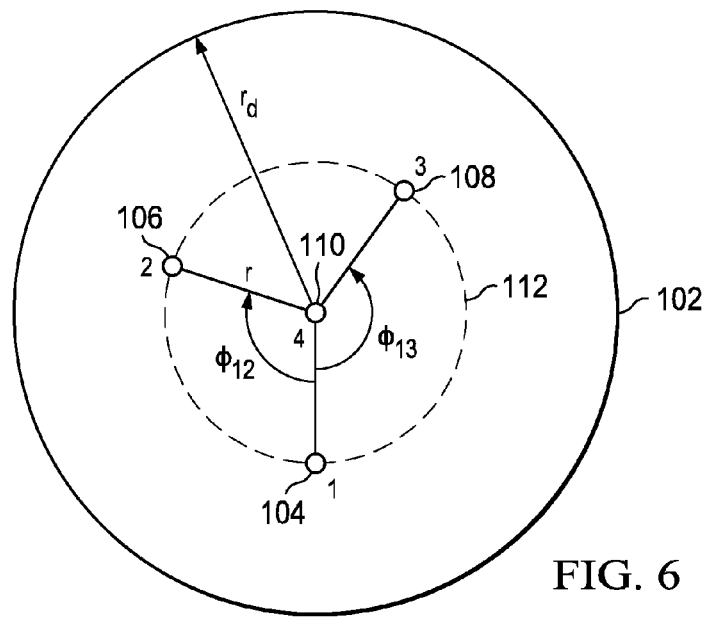
FIG. 6 shows a cross-section view of a four-core single-mode optical fiber associated the Brillouin-based distributed bend fiber sensor in accordance with an embodiment of the present disclosure.

FIG. 6 shows a cross-section view of the four-core single-mode optical fiber 102 used for the Brillouin-based distributed bend fiber sensors 100, 100a, 100b, 100c and 100d (note: the Brillouin-based distributed bend fiber sensors 100, 100a, 100b, 100c and 100d could also use a five (or higher) core single-mode optical fiber 102 with respective five (or higher) Brillouin backscattering sensing mechanisms). The fiber 102 has a circular shape with a clad radius of $r_d$, three fiber cores 1, 2, 3 (cores 104, 106 and 108) which are located at three different places in a circle 112 with a radius of r to the center of the fiber 102, and core 4 (core 110) which is located at the center of the fiber 102. The azimuthal angle between core 1 and core 2 is $\phi_{12}$, and the azimuthal angle between core 1 and core 3 is $\phi_{13}$. The parameters and refractive index profiles of the four cores 1, 2, 3, and 4 can be identical or different. However, it is preferred that the center core 4 has different effective refractive index when compared to cores 1, 2, and 3 for minimizing the crosstalk between the center core 4 and the other cores 1, 2, and 3. The center core 4 is used to sense temperature along the fiber 102 through monitoring the BFS distribution along this core 4, and the other three cores 1, 2, and 3 are used to sense bend radius R and bend angle $\beta$ along the fiber 102 though monitoring the BFS distribution along each of the cores 1, 2, 3, and 4 (see equations 3-14).

Figure 7:
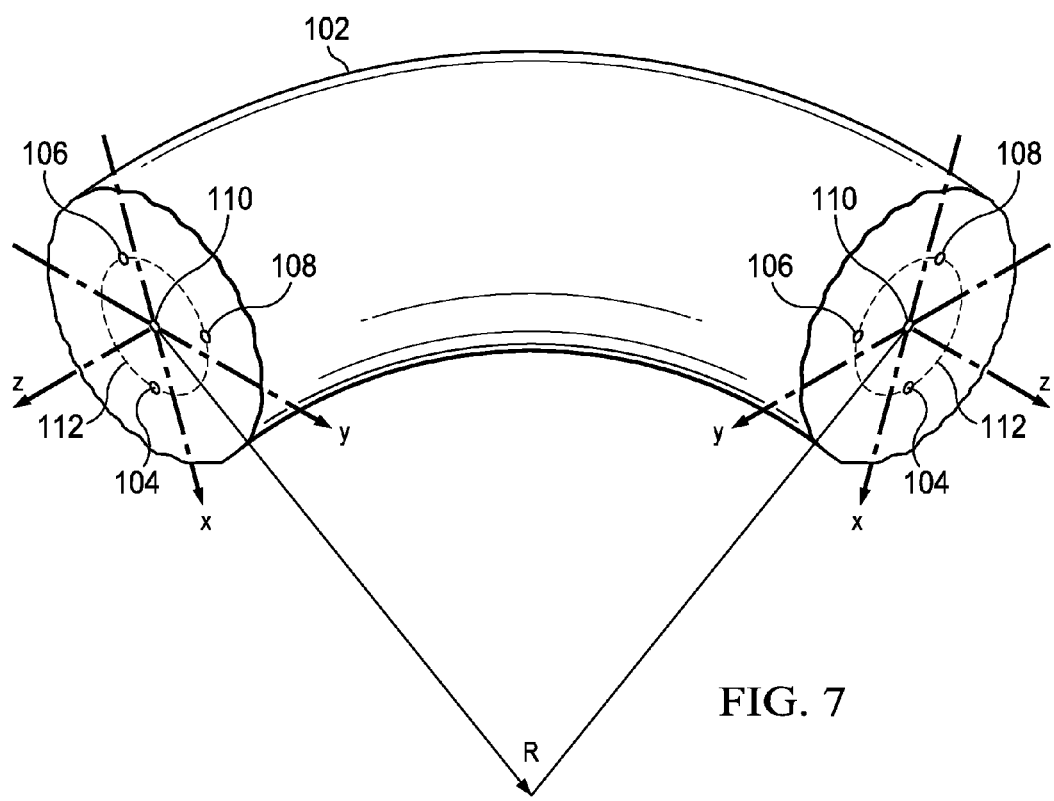
FIG. 7 is a diagram that shows the geometry of a bent four-core fiber associated the Brillouin-based distributed bend fiber sensor in accordance with an embodiment of the present disclosure.
Figure 8:
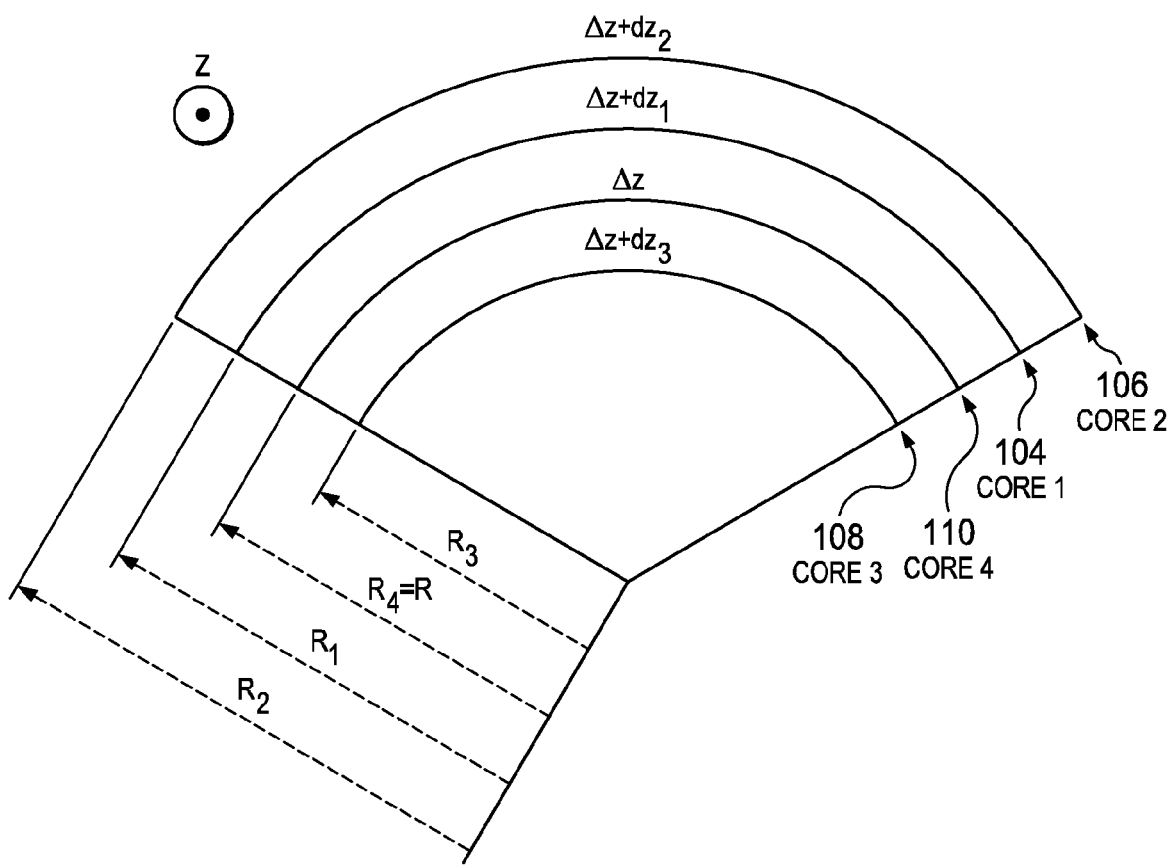
FIG. 8 is another diagram that shows the geometry of the bent four-core fiber associated the Brillouin-based distributed bend fiber sensor in accordance with an embodiment of the present disclosure.
Figure 9:
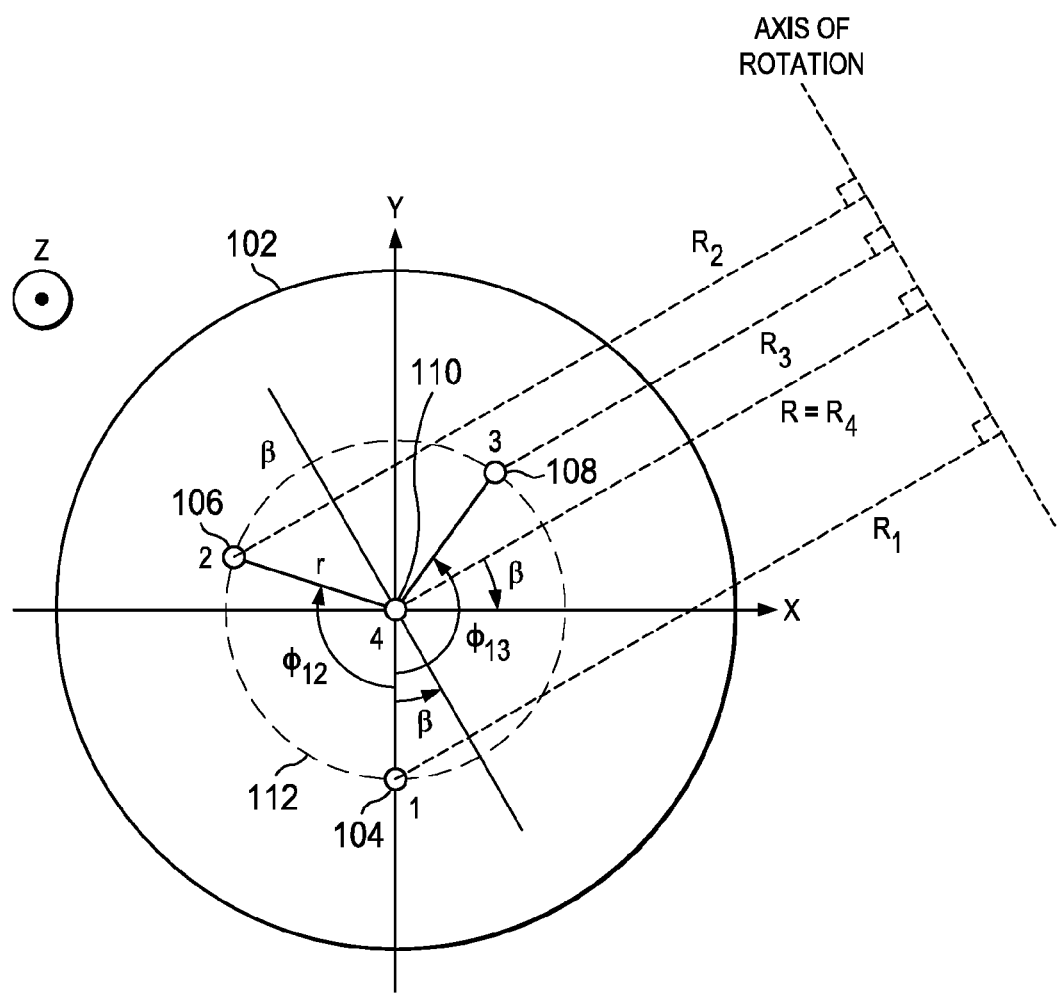
FIG. 9 is a diagram that shows a cross-section view of the bent four-core fiber associated the Brillouin-based distributed bend fiber sensor in accordance with an embodiment of the present disclosure; and, FIG. 10 is a flowchart illustrating the steps of an exemplary method for using the Brillouin-based distributed bend fiber sensor in accordance with an embodiment of the present disclosure.

Considering a segment of fiber 102 with a length $\Delta z$ at fiber distance z, when there is no bend to this fiber segment, all four cores 1, 2, 3, 4 have the same length of $\Delta z$. However, when a curvature with a bend radius of R is introduced into the fiber 102, in general, cores 1, 2, 3, and 4 will have different distances (or bend radius) from the center of the curvature, represented by $R_1$, $R_2$, $R_3$, and $R_4$=R respectively. FIGS. 7 and 8 are diagrams that show the geometry of the bent four-core fiber 102 (note: In FIG. 8 the sensor fiber 102 is split into multiple segments where each segment is small enough that the bend of each segment can be treated as a constant radius of curvature R). FIG. 9 shows a cross-section view of the bent four-core fiber 102 when the fiber 102 has a bend with a radius of R and a bend angle $\beta$ (i.e., the angle between the rotation axis and the x axis of the local coordinate system). A local coordinate system (x, y, z) is defined as shown FIGS. 7 and 9, where the z axis is the along the center line of the fiber 102, and the x and y axis are in the plane of the fiber 102 cross-section. As shown in FIG. 7, since all of the core segments subtend the same curvature angle, each core 1, 2, 3 will have the same ratio of core length to its bend radius, which can be expressed as follows:

$$\frac{\Delta z + dz_1}{R_1} = \frac{\Delta z + dz_2}{R_2} = \frac{\Delta z + dz_3}{R_3} = \frac{\Delta z}{R} \quad (3)$$

where $dz_1$, $dz_2$, and $dz_3$ are the length changes of cores 1, 2, 3 due to the bend, respectively. Since core 4 is located at the center of the fiber 102, the bend does not cause the length of core 4 to change. Thus, the bend in the fiber 102 does not introduce a strain change to core 4 (i.e., $\Delta\varepsilon_4$=0).

Considering the definition of the strain being the ratio of the change in fiber length to the original pre-bend fiber length, the bend introduced strains in cores 1, 2, 3, and 4 are $\Delta\varepsilon_1 = dz_1/\Delta z$, $\Delta\varepsilon_2 = dz_2/\Delta z$, $\Delta\varepsilon_3 = dz_3/\Delta z$, $\Delta\varepsilon_4$=0, respectively. As mentioned above, the fiber bend does not produce any strain in core 4 since it is located at the center line of the fiber 102. In this case, the equation (3) can be re-written as follows:

$$\frac{1 + \Delta\varepsilon_1}{R_1} = \frac{1 + \Delta\varepsilon_2}{R_2} = \frac{1 + \Delta\varepsilon_3}{R_3} = \frac{1}{R} \quad (4)$$

The radii $R_1$, $R_2$, and $R_3$ with reference to FIG. 9 can be expressed by the bend radius R and the bend angle of $\beta$ as follows:

$$R_1 = R + r \sin\beta \quad (5a)$$

$$R_2 = R + r \sin(\beta + \phi_{12}) \quad (5b)$$

$$R_3 = R + r \sin(\beta - \phi_{13}) \quad (5c)$$

Equations (5a), (5b) and (5c) can be respectively re-written as follows:

$$r = (R_1 - R)\sin\beta \quad (6a)$$

$$\sin\beta \cos\phi_{12} + \cos\beta \sin\phi_{12} = (R_2 - R)/r \quad (6b)$$

$$\sin\beta \cos\phi_{13} - \cos\beta \sin\phi_{13} = (R_3 - R)/r \quad (6c)$$

Recall: r is the radius from cores 1, 2, and 3 to the center of the fiber 102. Note: the sensor fiber 102 is split into multiple segments where each segment is small enough that the temperature and strain for each segment can be treated as a constant temperature and strain.

Substituting Eq. (6a) into Eq.(6b) and Eq.(6c), one would obtain the following:

$$\sin\beta\cos\phi_{12} + \cos\beta\sin\phi_{12} = \frac{(R_2/R - 1)}{(R_1/R - 1)}\sin\beta \quad (7a)$$

$$\sin\beta\cos\phi_{13} - \cos\beta\sin\phi_{13} = \frac{(R_3/R - 1)}{(R_1/R - 1)}\sin\beta \quad (7b)$$

Then, substituting Equation (4) into Equations 7(a) and 7(b), one could obtain the solution for the bend angle $\beta$ which is as follows:

$$\tan(\beta) = \frac{(\Delta\varepsilon_3 - \Delta\varepsilon_1)\sin\phi_{12} + (\Delta\varepsilon_2 - \Delta\varepsilon_1)\sin\phi_{13}}{(\Delta\varepsilon_3 - \Delta\varepsilon_2) - (\Delta\varepsilon_3 - \Delta\varepsilon_1)\cos\phi_{12} + (\Delta\varepsilon_2 - \Delta\varepsilon_1)\cos\phi_{13}} \quad (8)$$

Equation (8) shows that the bend angle $\beta$ is dependent only on the differential strains between cores 3 and 1 ($\Delta\varepsilon_3 - \Delta\varepsilon_1$), cores 3 and 2 ($\Delta\varepsilon_3 - \Delta\varepsilon_2$), and cores 3 and 2 ($\Delta\varepsilon_3 - \Delta\varepsilon_2$).

From Equations (4) and (5), the bend radius R can be calculated from any one of the following equations:

$$R = \frac{r\sin\beta}{\Delta\varepsilon_1} \quad (9a)$$

$$R = \frac{r\sin(\beta + \phi_{12})}{\Delta\varepsilon_2} \quad (9b)$$

$$R = \frac{r\sin(\beta + \phi_{13})}{\Delta\varepsilon_3} \quad (9c)$$

In general, each of above equations (9a), (9b) and (9c) gives the same solution for the bend radius R. For the cases, when the strain in one of the equations is zero, the other two equations should be used to compute the bend radius R. For example, when 0=0 or 180 degrees, then R1 equals to R. Therefore, no bend strain is introduced core 1. In this case, the bend radius R can be calculated by equation (9b) or equation (9c). The same scheme can be used for the cases when R2=R ($\beta+\phi_{12}$=0 or 180 degree), or R3=R ($\beta-\phi_{13}$=0 or 180 degree), the bend radius R can be calculated by using equations (9a) or (9c), or equations (9a) or (9b), respectively. Accordingly, when the bend introduced strains $\Delta\varepsilon_1$, $\Delta\varepsilon_e$, and $\Delta\varepsilon_3$ of cores 1, 2, 3 are measured at a fiber location, the bend radius R and bend angle β at this fiber location can be calculated by using equations (9a-c) and equation.(8), respectively.

As discussed above, in the single mode optical fiber 102, the BFS ($v_B$) is temperature and strain dependent as a result of the thermal expansion and bend experienced by the fiber 102 (see equation (2)), so that the BFS ($v_B$) changes with temperature and strain. Thus, the bend introduced strains $\Delta\varepsilon_1$, $\Delta\varepsilon_2$, and $\Delta\varepsilon_3$ of cores 1, 2, 3 can be measured by measuring the change of BFSs $\Delta v_{B1}$, $\Delta v_{B2}$, and $\Delta v_{B3}$ caused by the bend of the fiber 102 and the changes with temperature of cores 1, 2, and 3. The center core 4 is introduced to measure the change of BFSs $v_{B4}$ due to temperature only. Accordingly, the change of the BFSs $\Delta v_{B1}$, $\Delta v_{B2}$, $\Delta v_{B3}$, and $\Delta v_{B4}$ of the fiber cores 1, 2, 3, 4 with strain variation ($\Delta\varepsilon$) introduced by the bend and temperature variation ($\Delta T$) can be, respectively, written as follows:

$$\Delta v_{B1} = K_{\varepsilon 1}\Delta\varepsilon_1 + K_{T1}\Delta T \quad (10)$$

$$\Delta v_{B2} = K_{\varepsilon 2}\Delta\varepsilon_2 + K_{T2}\Delta T \quad (11)$$

$$\Delta v_{B3} = K_{\varepsilon 3}\Delta\varepsilon_3 + K_{T3}\Delta T \quad (12)$$

$$\Delta v_{B4} = K_{\varepsilon 4}\Delta\varepsilon_4 + K_{T4}\Delta T = K_{T4}\Delta T \quad (13)$$

where $K\varepsilon_{1,2,3,4}$ and $K_{T1,2,3,4}$ are the strain and temperature coefficients of the fiber cores 1, 2, 3 and 4, respectively (note: $K_T$ describes the change of BFS caused by temperature variation, its unit is MHz/° C. while $K\varepsilon$ describes the change of BFS caused by strain variation, its unit is MHz/µε where µε is a unit of measurement of strain in which a microstrain equals the strain that produces a deformation of one part per million). As shown in equation (13), considering that that the diameter of the fiber core 4 is much smaller than the diameter of the fiber 102 and considering that core 4 is located at the center line of the fiber 102, the fiber bend does not introduce any strain $\Delta\varepsilon_4$ in core 4. Accordingly, the temperature distribution $\Delta T$ along the bent fiber 102 can be measured by monitoring the BFS distribution $\Delta v_{B4}$ of the core 4 along the fiber 102.

Further, the bend induced strain $\Delta\varepsilon_1$, $\Delta\varepsilon_2$, and $\Delta\varepsilon_3$ in cores 1, 2, and 3 can be calculated by measuring the changes of BFSs $\Delta v_{B1}$, $\Delta v_{B2}$, $\Delta v_{B3}$, and $\Delta v_{B4}$ in cores 1, 2, 3 and 4 as follows:

$$\Delta\varepsilon_1 = \frac{1}{K_{\varepsilon 1}}\left(\Delta v_{B1} - \frac{K_{T1}}{K_{T4}}\Delta v_{B4}\right) \quad (14)$$

$$\Delta\varepsilon_2 = \frac{1}{K_{\varepsilon 2}}\left(\Delta v_{B2} - \frac{K_{T2}}{K_{T4}}\Delta v_{B4}\right) \quad (15)$$

$$\Delta\varepsilon_3 = \frac{1}{K_{\varepsilon 3}}\left(\Delta v_{B3} - \frac{K_{T3}}{K_{T4}}\Delta v_{B4}\right) \quad (16)$$

Finally, the bend angle β and the bend radius R at a location of the fiber 102 can be calculated by using equations (8) and (9), and the distribution of the bend angle $\Delta\beta$ and bend radius $\Delta R$ along the optical fiber may be obtained by utilizing the OTDR technique. It should be appreciated that the bend angle $\Delta\beta$ represents the_twist or bend direction along the fiber 102 and the bend radius $\Delta R$ represents the bend radius along the fiber 102.

Figure 10:
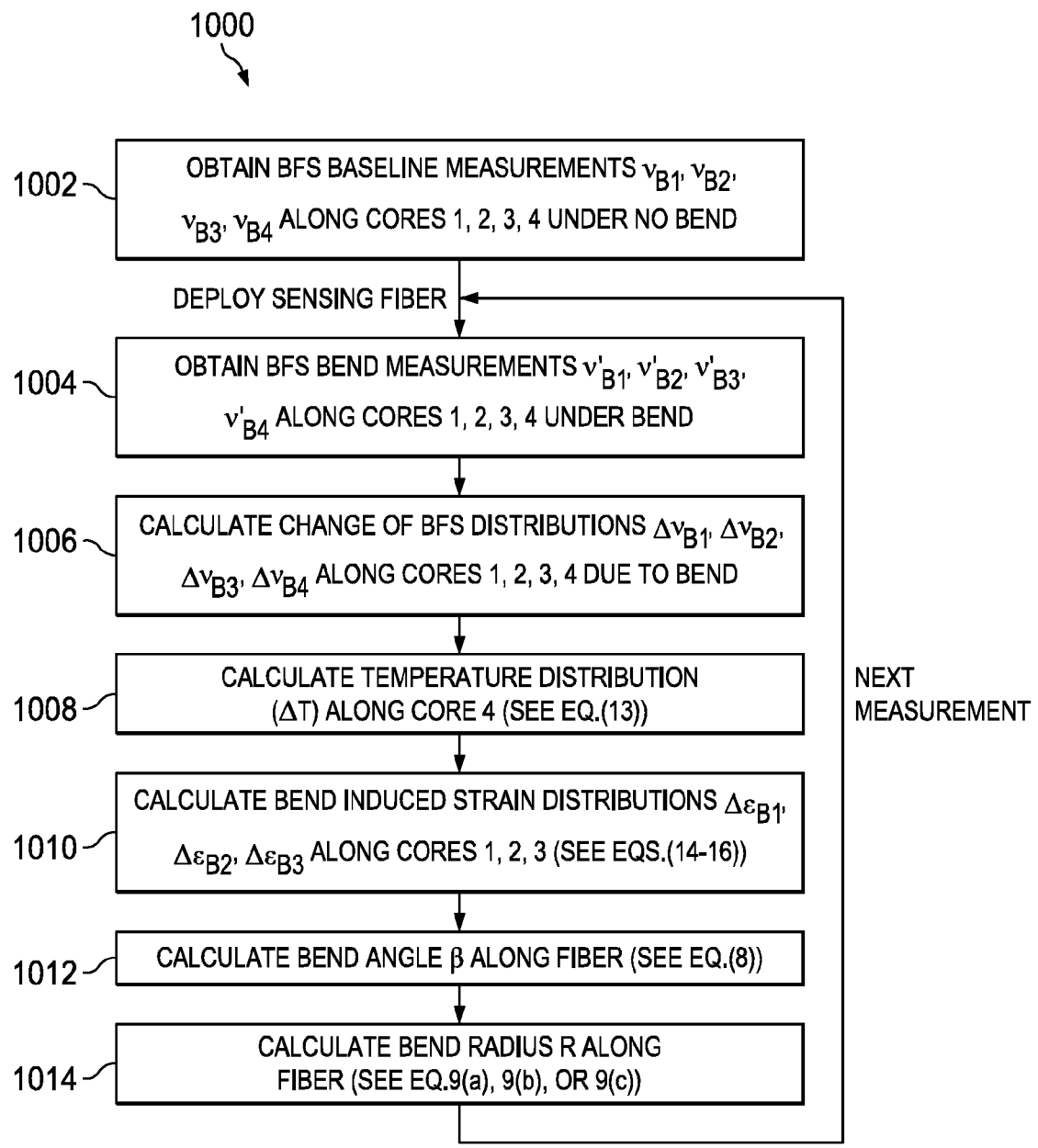

Referring to FIG. 10, there is a flowchart illustrating an exemplary method 1000 for using the Brillouin-based distributed bend fiber sensor 100, 100a, 100b, 100c, 100d to measure a temperature distribution ($\Delta T$), a bend angle β, and a bend radius R along a deployed four-core fiber 102 in accordance with an embodiment of the present disclosure. Beginning at step 1002, the processing system 116 prior to deployment of the fiber 102 when the fiber 102 has no bend applied thereto operates and obtains from the Brillouin backscattering sensing mechanism 114, 114', 114", 114a, 114d, 114c and 114d the following: a first BFS baseline measurement ($v_{B1}$) along the first core 104 (core 1), a second BFS baseline measurement ($v_{B2}$) along the second core 106 (core 2), a third BFS baseline measurement ($v_{B3}$) along the third core 108 (core 3), and a fourth BFS baseline measurement ($v_{B4}$) along the fourth core 110 (core 4).

At step 1004, the processing system 116 after the deployment of the fiber 102 and when there is a bend applied to the fiber 102 operates and obtains from the Brillouin backscattering sensing mechanism 114, 114', 114", 114a, 114d, 114c and 114d the following: a first BFS bend measurement ($v'_{B1}$) along the first core 104 (core 1), a second BFS bend measurement ($v'_{B2}$) along the second core 106 (core 2), a third BFS bend measurement ($v'_{B3}$) along the third core 108 (core 3), and a fourth BFS bend measurement ($v'_{B4}$) along the fourth core 110 (core 4).

At step 1006, the processing system 116 calculates a change of a first, second, third, and fourth BFS distribution ($\Delta v_{B1}$, $\Delta v_{B2}$, $\Delta v_{B3}$, $\Delta v_{B4}$) respectively along the first, second, third, and fourth cores 104, 106, 108, 110 (cores 1, 2, 3, 4). For example, the processing system 116 can calculate the change of the first, second, third, and fourth BFS distribution ($\Delta v_{B1}$, $\Delta v_{B2}$, $\Delta v_{B3}$, $\Delta v_{B4}$) using the following equations: $\Delta v_{B1}=v'_{B1}-v_{B1}$; $\Delta v_{B1}=v_{B1}$, $\Delta v_{B1}=v_{B1}-v_{B1}$, and, $\Delta v_{B1}=v_{B1}-v_{B1}$.

At step 1008, the processing system 116 calculates a temperature distribution ($\Delta T$) along the deployed fiber 102. For example, the processing system 116 can calculate the temperature distribution ($\Delta T$) along the deployed fiber 102 using equation (13) as follows: $\Delta v_{B4}=K_{\varepsilon 4}\Delta\varepsilon_4 + K_{T4}\Delta T = K_{T4}\Delta T$, wherein: $K_{T4}$ is a temperature coefficient of the fourth core 110 (core 4). Recall: there is no fourth bend induced strain distribution (AO associated with the fourth core 110 (core 4) because the bend applied to the fiber 102 does not cause a change in a length (z) of the fourth core 110 (core 4).

At step 1010, the processing system 116 calculates a first, second, and third bend induced strain distributions ($\Delta\varepsilon_1$, $\Delta\varepsilon_2$, $\Delta\varepsilon_3$,) respectively along the first, second, and third cores 104, 106, 108, 110 (cores 1, 2, 3, 4). For example, the processing system 116 can calculate the first, second, third, and fourth bend induced strain distribution ($\Delta\varepsilon_1$, $\Delta\varepsilon_2$, $\Delta\varepsilon_3$, $\Delta\varepsilon_4$) using the equations (14-16) as follows:

$$\Delta\varepsilon_1 = \frac{1}{K_{\varepsilon 1}}\left(\Delta v_{B1} - \frac{K_{T1}}{K_{T4}}\Delta v_{B4}\right); \Delta\varepsilon_2 = \frac{1}{K_{\varepsilon 2}}\left(\Delta v_{B2} - \frac{K_{T2}}{K_{T4}}\Delta v_{B4}\right); \text{ and}$$

$$\Delta\varepsilon_3 = \frac{1}{K_{\varepsilon 3}}\left(\Delta v_{B3} - \frac{K_{T3}}{K_{T4}}\Delta v_{B4}\right)$$

wherein: $K\varepsilon_{1,2,3}$ and $K_{T1,2,3,4}$ are respectively the strain and temperature coefficients of the first, second, third and fourth cores 104, 106, 108, 110 (cores 1, 2, 3, 4).

At step 1012, the processing system 116 calculates a bend angle $\beta$ along the deployed fiber 102. For example, the processing system is further configured to calculate the bend angle $\beta$ along the deployed fiber by using equation (8) as follows:

$$\tan(\beta) = \frac{(\Delta\varepsilon_3 - \Delta\varepsilon_1)\sin\phi_{12} + (\Delta\varepsilon_2 - \Delta\varepsilon_1)\sin\phi_{13}}{(\Delta\varepsilon_3 - \Delta\varepsilon_2) - (\Delta\varepsilon_3 - \Delta\varepsilon_1)\cos\phi_{12} + (\Delta\varepsilon_2 - \Delta\varepsilon_1)\cos\phi_{13}},$$

wherein: $\phi_{12}$ is an azimuthal angle between the first core 104 and the second core 106, and $\phi_{13}$ is an azimuthal angle between the first core 104 and the third core 108.

At step 1014, the processing system 116 calculates a bend radius R along the deployed fiber 102. For example, the processing system can be configured to calculate the bend angle R along the deployed fiber 102 by using anyone of the equations (9a), (9b), and (9c) as follows:

$$R = \frac{r\sin\beta}{\Delta\varepsilon_1}, R = \frac{r\sin(\beta+\phi_{12})}{\Delta\varepsilon_2}, \text{ or } R = \frac{r\sin(\beta+\phi_{13})}{\Delta\varepsilon_3}$$

wherein: $\phi_{12}$ is an azimuthal angle between the first core 104 (core 1) and the second core 106 (core 2); $\phi_{13}$ is an azimuthal angle between the first core 104 (core 1) and the third core 108 (core 3); and r is the radius along the circular path 112 to the center of the fiber 102, where the first, second, and third cores 104, 106, 108 (cores 1, 2, 3) are located at three different positions along the circular path 112 within the fiber 102. At the end of step 1014, the method 1000 returns to step 1004. Note: the processing system 116 may include a processor, and a memory that stores processor-executable instructions where the processor interfaces with the memory and executes the processor-executable instructions to implement steps 1002, 1004, 1006, 1008, 1010, 1012 and 1014.

In view of the foregoing, one skilled in the art will readily appreciate that the present disclosure discloses a fully distributed bend fiber sensor that has a long sensing distance (e.g., tens of kilometers) and is able to distinguish the strain and temperature effects. In this fully distributed bend fiber sensor, a four-core fiber is used as the sensing medium to enable simultaneous bend and temperature measurement and the Brillouin backscattering effect is used as the sensing mechanism. The distributed sensing of bend and temperature is realized by using the technique of either Brillouin optical time domain reflectometry (BOTDR) or Brillouin optical time domain analysis (BOTDA). The fully distributed bend fiber sensors of the present disclosure have a lower cost and much longer sensing distance (e.g., 10 times longer) when compared with bend fiber sensors based on fiber Bragg gratings (FBGs). Plus, the fully distributed bend fiber sensor of the present disclosure has a much longer sensing distance (e.g., 2 times longer) when compared with bend fiber sensors based Rayleigh scattering using frequency domain reflectometry.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an opening" includes examples having two or more such "openings" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 10 mm" and "a dimension less than about 10 mm" both include embodiments of "a dimension less than about 10 mm" as well as "a dimension less than 10 mm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims.

The invention claimed is:

1. A Brillouin-based distributed fiber sensor comprising:
a fiber comprising a first core, a second core, a third core, and a fourth core, wherein the first core, the second core, and the third core are located at three different positions along a circular path within the fiber, wherein the circular path has a radius (r) to a center of the fiber, and wherein the fourth core is located at the center of the fiber; and,
a Brillouin backscattering sensing mechanism coupled to the first core, the second core, the third core, and the fourth core.

2. The Brillouin-based distributed fiber sensor of claim 1, further comprising:
a processing system, coupled to the Brillouin backscattering sensing mechanism, configured to:
obtain, prior to deployment of the fiber when the fiber has no bend applied thereto, from the Brillouin backscattering mechanism a first Brillouin frequency shift (BFS) baseline measurement ($v_{B1}$) along the first core, a second BFS baseline measurement ($v_{B2}$) along the second core, a third BFS baseline measurement ($v_{B3}$) along the third core, and a fourth BFS baseline measurement ($v_{B4}$) along the fourth core;
obtain, after deployment of the fiber and when there is a bend applied to the fiber, from the Brillouin backscattering mechanism a first BFS bend measurement ($v'_{B1}$) along the first core, a second BFS bend measurement ($v'_{B2}$) along the second core, a third BFS bend measurement ($v'_{B3}$) along the third core, and a fourth BFS bend measurement ($v'_{B4}$) along the fourth core;
calculate a change of a first, second, third, and fourth BFS distribution ($\Delta v_{B1}$, $\Delta v_{B2}$, $\Delta v_{B3}$, $\Delta v_{B4}$) respectively along the first, second, third, and fourth cores;
calculate a temperature distribution ($\Delta T$) along the deployed fiber;
calculate a first, second, and third bend induced strain distributions ($\Delta \varepsilon_1$, $\Delta \varepsilon_2$, $\Delta \varepsilon_3$,) respectively along the first, second, and third cores;
calculate a bend angle $\beta$ along the deployed fiber; and
calculate a bend radius R along the deployed fiber.

3. The Brillouin-based distributed fiber sensor of claim 2, wherein the processing system is further configured to calculate the change of the first, second, third, and fourth BFS distribution ($\Delta v_{B1}$, $\Delta v_{B2}$, $\Delta v_{B3}$, $\Delta v_{B4}$) using the following equations:

$$\Delta v_{B1} = v'_{B1} - v_{B1};$$

$$\Delta v_{B2} = v'_{B2} - v_{B2};$$

$$\Delta v_{B3} = v'_{B3} - v_{B3}; \text{ and,}$$

$$\Delta v_{B4} = v'_{B4} - v_{B4}.$$

4. The Brillouin-based distributed fiber sensor of claim 2, wherein the processing system is further configured to calculate the temperature distribution ($\Delta T$) along the deployed fiber using the following equation:

$$\Delta v_{B4} = K_{\varepsilon 4}\Delta \varepsilon_4 + K_{T4}66 = K_{T4}\Delta T$$

wherein: $K_{T4}$ is a temperature coefficient of the fourth core; and,
wherein there is no fourth bend induced strain distribution ($\Delta \varepsilon_4$) associated with the fourth core because the bend applied to the fiber does not cause a change in a length of the fourth core.

5. The Brillouin-based distributed fiber sensor of claim 2, wherein the processing system is further configured to calculate the first, second, and third bend induced strain distribution ($\Delta \varepsilon_1$, $\Delta \varepsilon_2$, $\Delta \varepsilon_3$) using the following equations:

$$\Delta \varepsilon_1 = \frac{1}{K_{\varepsilon 1}}\left(\Delta v_{B1} - \frac{K_{T1}}{K_{T4}}\Delta v_{B4}\right);$$

$$\Delta \varepsilon_2 = \frac{1}{K_{\varepsilon 2}}\left(\Delta v_{B2} - \frac{K_{T2}}{K_{T4}}\Delta v_{B4}\right); \text{ and}$$

$$\Delta \varepsilon_3 = \frac{1}{K_{\varepsilon 3}}\left(\Delta v_{B3} - \frac{K_{T3}}{K_{T4}}\Delta v_{B4}\right),$$

wherein $K_{\varepsilon 1, 2, 3}$ and $K_{T1, 2, 3, 4}$ are respectively strain and temperature coefficients of the first, second, third and fourth cores.

6. The Brillouin-based distributed fiber sensor of claim 2, wherein the processing system is further configured to calculate the bend angle $\beta$ along the deployed fiber using the following equations:

$$\tan(\beta) = \frac{(\Delta \varepsilon_3 - \Delta \varepsilon_1)\sin\phi_{12} + (\Delta \varepsilon_2 - \Delta \varepsilon_1)\sin\phi_{13}}{(\Delta \varepsilon_3 - \Delta \varepsilon_2) - (\Delta \varepsilon_3 - \Delta \varepsilon_1)\cos\phi_{12} + (\Delta \varepsilon_2 - \Delta \varepsilon_1)\cos\phi_{13}}$$

wherein: $\phi_{12}$ is an azimuthal angle between the first core and the second core; and
$\phi_{13}$ is an azimuthal angle between the first core and the third core.

7. The Brillouin-based distributed fiber sensor of claim 2, wherein the processing system is further configured to calculate the bend radius R along the deployed fiber anyone of the follow equations:

$$R = \frac{r\sin\beta}{\Delta \varepsilon_1};$$

$$R = \frac{r\sin(\beta + \phi_{12})}{\Delta \varepsilon_2}; \text{ or,}$$

$$R = \frac{r\sin(\beta + \phi_{13})}{\Delta \varepsilon_3}$$

wherein: $\phi_{12}$ is an azimuthal angle between the first core and the second core;
$\phi_{13}$ is an azimuthal angle between the first core and the third core; and
r is the radius along the circular path to the center of the fiber, where the first, second, and third cores are located at three different positions along the circular path within the fiber.

8. The Brillouin-based distributed fiber sensor of claim 1, wherein the Brillouin backscattering sensing mechanism is a Brillouin Optical Domain Reflectometry (BOTDR) Brillouin backscattering sensing mechanism comprising:
a first BOTDR Brillouin backscattering sensing mechanism comprising a first pump laser which launches pump pulses with a frequency ($v_1$) through a first optical circulator and a fan-out device into the first core, wherein Brillouin backscattering light from the first core with a frequency ($v_1 - v_{B1}$) outputted by the first local circulator is mixed by a first optical coupler with a continuous wave light with a fixed frequency ($v_{1L} \approx v_1 - v_{B1}$) generated by a first local oscillator, where a mixed optical signal from the first optical coupler is detected by a first optical coherent receiver, and where an electrical output from the first optical coherent receiver is analyzed by a first electrical signal processor which outputs either (i) a first Brillouin frequency shift (BPS) baseline measurement ($v_{B1}$) which is obtained prior to deployment of the fiber when the fiber has no bend applied thereto, or (ii) a first BFS bend measurement ($v'_{B1}$) which is obtained after the deployment of the fiber and there is a bend applied to the fiber;

a second BOTDR Brillouin backscattering sensing mechanism comprising a second pump laser which launches pump pulses with a frequency ($v_2$) through a second optical circulator and the fan-out device into the second core, wherein Brillouin backscattering light from the second core with a frequency ($v_2 - v_{B2}$) outputted by the second local circulator is mixed by a second optical coupler with a continuous wave light with a fixed frequency ($v_{2L} \approx v_2 - v_{B2}$) generated by a second local oscillator, where a mixed optical signal from the second optical coupler is detected by a second optical coherent receiver, and where an electrical output from the second optical coherent receiver is analyzed by a second electrical signal processor which outputs either (i) a second Brillouin frequency shift (BFS) baseline measurement ($v_{B2}$) which is obtained prior to deployment of the fiber when the fiber has no bend applied thereto, or (ii) a second BFS bend measurement ($v'_{B2}$) which is obtained after the deployment of the fiber and there is a bend applied to the fiber;

a third BOTDR Brillouin backscattering sensing mechanism comprising a third pump laser which launches pump pulses with a frequency ($v_3$) through a third optical circulator and the fan-out device into the third core, wherein Brillouin backscattering light from the third core with a frequency ($v_3 - v_{B3}$) outputted by the third local circulator is mixed by a third optical coupler with a continuous wave light with a fixed frequency ($v_{3L} \approx v_{13} - v_{B3}$) generated by a third local oscillator, where a mixed optical signal from the third optical coupler is detected by a third optical coherent receiver, and where an electrical output from the third optical coherent receiver is analyzed by a third electrical signal processor which outputs either (i) a third Brillouin frequency shift (BFS) baseline measurement ($v_{B3}$) which is obtained prior to deployment of the fiber when the fiber has no bend applied thereto, or (ii) a third BFS bend measurement ($v'_{B3}$) which is obtained after the deployment of the fiber and there is a bend applied to the fiber; and, a fourth BOTDR Brillouin backscattering sensing mechanism comprising a fourth pump laser which launches pump pulses with a frequency ($v_4$) through a fourth optical circulator and the fan-out device into the fourth core, wherein Brillouin backscattering light from the fourth core with a frequency ($v_4 - v_{B4}$) outputted by the fourth local circulator is mixed by a fourth optical coupler with a continuous wave light with a fixed frequency ($v_{4L} \approx v_4 - v_{B4}$) generated by a fourth local oscillator, where a mixed optical signal from the fourth optical coupler is detected by a fourth optical coherent receiver, and where an electrical output from the fourth optical coherent receiver is analyzed by a fourth electrical signal processor which outputs either (i) a fourth Brillouin frequency shift (BFS) baseline measurement ($v_{B4}$) which is obtained prior to deployment of the fiber when the fiber has no bend applied thereto, or (ii) a fourth BFS bend measurement ($v'_{B4}$) which is obtained after the deployment of the fiber and there is a bend applied to the fiber.

9. The Brillouin-based distributed fiber sensor of claim 1, wherein the Brillouin backscattering sensing mechanism is a Brillouin Optical Domain Reflectometry (BOTDR) Brillouin backscattering sensing mechanism comprising:

a first BOTDR Brillouin backscattering sensing mechanism comprising a first laser which launches a continuous wave light with a frequency ($v_{1L}$) to a first optical coupler that splits the continuous wave light into two parts, where a first optical intensity modulator converts the one part of the continuous wave light into pump pulses with a frequency ($v_1$) which are introduced by a first optical circulator and a fan-out device into the first core, where a first frequency shifter shifts the frequency ($v_{1L}$) of the other part of the continuous wave light to a fixed frequency ($v_{1L} \approx v_1 - v_{B1}$), wherein Brillouin backscattering light from the first core with a frequency ($v_1 - v_{B1}$) is mixed by a first optical coupler with the shifted continuous wave light with the fixed frequency ($v_{1L} \approx v_1 - v_{B1}$) provided by the first frequency shifter, where a mixed optical signal from the first optical coupler is detected by a first optical coherent receiver, and wherein an electrical output from the first optical coherent receiver is analyzed by a first electrical signal processor which outputs either (i) a first BFS baseline measurement $v_{B1}$ which is obtained prior to deployment of the fiber when the fiber has no bend applied thereto, or (ii) a first BFS bend measurement $v'_{B1}$ which is obtained after the deployment of the fiber and there is a bend applied to the fiber;

a second BOTDR Brillouin backscattering sensing mechanism comprising a second laser which launches a continuous wave light with a frequency ($v_{2L}$) to a second optical coupler that splits the continuous wave light into two parts, where a second optical intensity modulator converts the one part of the continuous wave light into pump pulses with a frequency ($v_2$) which are introduced by a second optical circulator and the fan-out device into the second core, where a second frequency shifter shifts the frequency ($v_{2L}$) of the other part of the continuous wave light to a fixed frequency ($v_{2L} \approx v_2 - v_{B2}$), wherein Brillouin backscattering light from the second core with a frequency ($v_2 - v_{B2}$) is mixed by a second optical coupler with the shifted continuous wave light with the fixed frequency ($v_{2L} \approx v_2 - v_{B2}$) provided by the second frequency shifter, where a mixed optical signal from the second optical coupler is detected by a second optical coherent receiver, and wherein an electrical output from the second optical coherent receiver is analyzed by a second electrical signal processor which outputs either (i) a second BFS baseline measurement $v_{B2}$ which is obtained prior to deployment of the fiber when the fiber has no bend applied thereto, or (ii) a second BFS bend measurement $v'_{B2}$ which is obtained after the deployment of the fiber and there is a bend applied to the fiber;

a third BOTDR Brillouin backscattering sensing mechanism comprising a third laser which launches a continuous wave light with a frequency ($v_{3L}$) to a third optical coupler that splits the continuous wave light into two parts, where a third optical intensity modulator converts the one part of the continuous wave light into pump pulses with a frequency ($v_3$) which are introduced by a third optical circulator and the fan-out device into the third core, where a third frequency shifter shifts the frequency ($v_{3L}$) of the other part of the continuous wave light to a fixed frequency ($v_{3L} \approx v_3 - v_{B3}$), wherein Brillouin backscattering light from the third core with a frequency ($v_3 - v_{B3}$) is mixed by a third optical coupler with the shifted continuous wave light with the fixed frequency ($v_{3L} \approx v_3 - v_{B3}$) provided by the third frequency shifter, where a mixed optical signal from the third optical coupler is detected by a third optical coherent receiver, and wherein an electrical output from the third optical coherent receiver is analyzed by a third electrical signal processor which outputs either (i) a third BFS baseline measurement $v_{B3}$ which is obtained prior to deployment of the fiber when the fiber has no bend applied thereto, or (ii) a third BFS bend measurement $v'_{B3}$ which is obtained after the deployment of the fiber and there is a bend applied to the fiber; and, a fourth BOTDR Brillouin backscattering sensing mechanism comprising a fourth laser which launches a continuous wave light with a frequency ($v_{4L}$) to a fourth optical coupler that splits the continuous wave light into two parts, where a fourth optical intensity modulator converts the one part of the continuous wave light into pump pulses with a frequency ($v_4$) which are introduced by a fourth optical circulator and the fan-out device into the fourth core, where a fourth frequency shifter shifts the frequency ($v_{4L}$) of the other part of the continuous wave light to a fixed frequency ($v_{4L} \approx v_4 - v_{B4}$), wherein Brillouin backscattering light from the fourth core with a frequency ($v_{4L} - v_{B4}$) is mixed by a fourth optical coupler with the shifted continuous wave light with the fixed frequency ($v_{4L} \approx v_4 - v_{B4}$) provided by the fourth frequency shifter, where a mixed optical signal from the fourth optical coupler is detected by a fourth optical coherent receiver, and wherein an electrical output from the fourth optical coherent receiver is analyzed by a fourth electrical signal processor which outputs either (i) a fourth BFS baseline measurement $v_{B4}$ which is obtained prior to deployment of the fiber when the fiber has no bend applied thereto, or (ii) a fourth BFS bend measurement $v'_{B4}$ which is obtained after the deployment of the fiber and there is a bend applied to the fiber.

10. The Brillouin-based distributed fiber sensor of claim 1, wherein the Brillouin backscattering sensing mechanism is a Brillouin Optical Domain Analysis (BOTDA) Brillouin backscattering sensing mechanism comprising:

a first BOTDA Brillouin backscattering sensing mechanism comprising a first pump laser and a first probe laser, wherein the first pump laser launches pump pulses with a frequency ($v_1$) through a first optical circulator and a first fan-out device into the first core, wherein the first probe laser launches a continuous wave light with a frequency ($v_{1L} \approx v_1 - v_{B1}$ (or $v_1 - v_{B2}$)) through the first fan-out device into the second core, wherein a second fan-out device couples the first core and the second core, wherein a probe signal is detected by a first photo detector that is coupled to the first optical circulator, and wherein an electrical signal output by the first photo detector is analyzed by a first electrical signal processor which outputs either (i) a first Brillouin frequency shift (BFS) baseline measurement $v_{B1}$ and a second BFS baseline measurement $v_{B2}$ which are obtained prior to deployment of the fiber when the fiber has no bend applied thereto, or (ii) a first BFS bend measurement $v'_{B1}$ and a second BFS bend measurement $v'_{B2}$ which are obtained after the deployment of the fiber and there is a bend applied to the fiber; and, a second BOTDA Brillouin backscattering sensing mechanism comprising a second pump laser and a second probe laser, wherein the second pump laser launches pump pulses with a frequency ($v_2$) through a second optical circulator and the first fan-out device into the third core, wherein the second probe laser launches a continuous wave light with a frequency ($v_{2L} \approx v_2 - v_{B3}$ (or $v_2 - v_{B4}$)) through the first fan-out device into the fourth core, wherein a probe signal is detected by a second photo detector that is coupled to the second optical circulator, and wherein an electrical signal output by the second photo detector is analyzed by a second electrical signal processor which outputs either (i) a third Brillouin BFS baseline measurement $v_{B3}$ and a fourth BFS baseline measurement $v_{B4}$ which are obtained prior to deployment of the fiber when the fiber has no bend applied thereto, or (ii) a third BFS bend measurement $v'_{B3}$ and a fourth BFS bend measurement $v'_{B4}$ which are obtained after the deployment of the fiber and there is a bend applied to the fiber.

11. The Brillouin-based distributed fiber sensor of claim 1, wherein the Brillouin backscattering sensing mechanism is a Brillouin Optical Domain Analysis (BOTDA) Brillouin backscattering sensing mechanism comprising:

a first BOTDA Brillouin backscattering sensing mechanism comprising a first laser which launches a continuous wave light with a frequency ($v_{1L}$) to a first optical coupler that splits the continuous wave light into two parts, wherein a first optical modulator converts the one part of the continuous wave light into pump pulses with a frequency ($v_1$) which is introduced by a first optical circulator and a first fan-out device into the first core, wherein a first frequency shifter shifts the frequency ($v_{1L}$) of the other part of the continuous wave light to a frequency ($v_{1L} \approx v_1 - v_{B1}$ (or $v_1 - v_{B2}$)) where the shift continuous wave light is introduced by the first fan-out device into the second core, wherein a second fan-out device couples the first core and the second core, wherein a probe signal is detected by a first photo detector that is coupled to the first optical circulator, and wherein an electrical signal output by the first photo detector is analyzed by a first electrical signal processor which outputs either (i) a first Brillouin frequency shift (BFS) baseline measurement $v_{B1}$ and a second BFS baseline measurement $v_{B2}$ which are obtained prior to deployment of the fiber when the fiber has no bend applied thereto, or (ii) a first BFS bend measurement $v'_{B1}$ and a second BFS bend measurement $v'_{B2}$ which are obtained after the deployment of the fiber and there is a bend applied to the fiber; and, a second BOTDA Brillouin backscattering sensing mechanism comprising a second laser which launches a continuous wave light with a frequency ($v_{2L}$) to a second optical coupler that splits the continuous wave light into two parts, wherein a second optical modulator converts the one part of the continuous wave light into pump pulses with a frequency ($v_2$) which is introduced by a second optical circulator and the fan-out device into the third core, wherein a second frequency shifter shifts the frequency ($v_{2L}$) of the other part of the continuous wave light to a frequency ($v_{2L} \approx v_2 - v_{B3}$ (or $v_2 - v_{B4}$)) where the shift continuous wave light is introduced by the first fan-out device into the fourth core, wherein a probe signal is detected by a second photo detector that is coupled to the second optical circulator, and wherein an electrical signal output by the second photo detector is analyzed by a second electrical signal processor which outputs either (i) a third BFS baseline measurement $v_{B3}$ and a fourth BFS baseline measurement $v_{B4}$ which are obtained prior to deployment of the fiber when the fiber has no bend applied thereto, or (ii) a third BFS bend measurement $v'_{B3}$ and a fourth BFS bend measurement $v'_{B4}$ which are obtained after the deployment of the fiber and there is a bend applied to the fiber.

12. A method for using a Brillouin-based distributed fiber sensor comprising: a fiber comprising a first core, a second core, a third core, and a fourth core, wherein the first core, the second core, and the third core are located at three different positions along a circular path within the fiber, wherein the circular path has a radius (r) to a center of the fiber, and wherein the fourth core is located at the center of the fiber; and, a Brillouin backscattering sensing mechanism coupled to the first core, the second core, the third core, and the fourth core, the method comprising the steps of:

obtaining, prior to deployment of the fiber when the fiber has no bend applied thereto, from the Brillouin backscattering mechanism a first Brillouin frequency shift (BFS) baseline measurement ($v_{B1}$) along the first core, a second BFS baseline measurement ($v_{B2}$) along the second core, a third BFS baseline measurement ($v_{B3}$) along the third core, and a fourth BFS baseline measurement ($v_{B4}$) along the fourth core;

obtaining, after deployment of the fiber and when there is a bend applied to the fiber, from the Brillouin backscattering mechanism a first BFS bend measurement ($v'_{B1}$) along the first core, a second BFS bend measurement ($v'_{B2}$) along the second core, a third BFS bend measurement ($v'_{B3}$) along the third core, and a fourth BFS bend measurement ($v'_{B4}$) along the fourth core;

calculating a change of a first, second, third, and fourth BFS distribution ($\Delta v_{B1}$, $\Delta v_{B2}$, $\Delta v_{B3}$, $\Delta v_{B4}$) respectively along the first, second, third, and fourth cores;

calculating a temperature distribution ($\Delta T$) along the deployed fiber;

calculating a first, second, and third bend induced strain distributions ($\Delta \varepsilon_1$, $\Delta \varepsilon_2$, $\Delta \varepsilon_3$, ) respectively along the first, second, and third cores;

calculating a bend angle β along the deployed fiber; and calculating a bend radius R along the deployed fiber.

13. The method of claim 12, wherein the step of calculating the change of the first, second, third, and fourth BFS distribution ($\Delta v_{B1}$, $\Delta v_{B2}$, $\Delta v_{B3}$, $\Delta v_{B4}$) further comprises using the following equations:

$$\Delta v_{B1} = v'_{B1} - v_{B1};$$

$$\Delta v_{B1} = v'_{B1} - v_{B1};$$

$$\Delta v_{B1} = v'_{B1} - v_{B1}; \text{ and,}$$

$$v_{B1} = v'_{B1} - v_{B1}.$$

14. The method of claim 12, wherein the step of calculating the temperature distribution (AT) along the deployed fiber further comprises using the following equation:

$$\Delta v_{B4} = K_{\varepsilon 4}\Delta\varepsilon_4 = K_{T4}\Delta T = K_{T4}\Delta T$$

wherein: $K_{T4}$ is a temperature coefficient of the fourth core; and, wherein there is no fourth bend induced strain distribution ($\Delta \varepsilon_4$) associated with the fourth core because the bend applied to the fiber does not cause a change in a length of the fourth core.

15. The method of claim 12, wherein the step of calculating the first, second, and third bend induced strain distribution ($\Delta \varepsilon_1$, $\Delta \varepsilon_2$, $\Delta \varepsilon_3$) further comprises using the following equations:

$$\Delta\varepsilon_1 = \frac{1}{K_{\varepsilon 1}}\left(\Delta v_{B1} - \frac{K_{T1}}{K_{T4}}\Delta v_{B4}\right);$$

$$\Delta\varepsilon_2 = \frac{1}{K_{\varepsilon 2}}\left(\Delta v_{B2} - \frac{K_{T2}}{K_{T4}}\Delta v_{B4}\right); \text{ and}$$

$$\Delta\varepsilon_3 = \frac{1}{K_{\varepsilon 3}}\left(\Delta v_{B3} - \frac{K_{T3}}{K_{T4}}\Delta v_{B4}\right),$$

wherein $K\varepsilon_{1,2,3}$ and $K_{T1,2,3,4}$ are respectively strain and temperature coefficients of the first, second, third and fourth cores.

16. The method of claim 12, wherein the step of calculating the bend angle β along the deployed fiber further comprises using the following equations:

$$\tan(\beta) = \frac{(\Delta\varepsilon_3 - \Delta\varepsilon_1)\sin\phi_{12} + (\Delta\varepsilon_2 - \Delta\varepsilon_1)\sin\phi_{13}}{(\Delta\varepsilon_3 - \Delta\varepsilon_2) - (\Delta\varepsilon_3 - \Delta\varepsilon_1)\cos\phi_{12} + (\Delta\varepsilon_2 - \Delta\varepsilon_1)\cos\phi_{13}}$$

wherein: $\phi_{12}$ is an azimuthal angle between the first core and the second core; and $\phi_{13}$ is an azimuthal angle between the first core and the third core.

17. The method of claim 12, wherein the step of calculating the bend radius R along the deployed fiber further comprises using anyone of the follow equations:

$$R = \frac{r\sin\beta}{\Delta\varepsilon_1};$$

$$R = \frac{r\sin(\beta + \phi_{12})}{\Delta\varepsilon_2}; \text{ or,}$$

$$R = \frac{r\sin(\beta + \phi_{13})}{\Delta\varepsilon_3}$$

wherein: $\phi_{12}$ is an azimuthal angle between the first core and the second core;

$\phi_{13}$ is an azimuthal angle between the first core and the third core; and r is the radius along the circular path to the center of the fiber, where the first, second, and third cores are located at three different positions along the circular path within the fiber.

18. The method of claim 12, wherein the Brillouin backscattering sensing mechanism is a Brillouin Optical Domain Reflectometry (BOTDR) Brillouin backscattering sensing mechanism comprising:

a first BOTDR Brillouin backscattering sensing mechanism comprising a first pump laser which launches pump pulses with a frequency ($v_1$) through a first optical circulator and a fan-out device into the first core, wherein Brillouin backscattering light from the first core with a frequency ($v_1 - v_{B1}$) outputted by the first local circulator is mixed by a first optical coupler with a continuous wave light with a fixed frequency ($v_{1L} \approx v_1 - v_{B1}$) generated by a first local oscillator, where a mixed optical signal from the first optical coupler is detected by a first optical coherent receiver, and where an electrical output from the first optical coherent receiver is analyzed by a first electrical signal processor which outputs either (i) a first Brillouin frequency shift (BFS) baseline measurement ($v_{B1}$) which is obtained prior to deployment of the fiber when the fiber has no bend applied thereto, or (ii) a first BFS bend measurement ($v'_{B1}$) which is obtained after the deployment of the fiber and there is a bend applied to the fiber;

a second BOTDR Brillouin backscattering sensing mechanism comprising a second pump laser which launches pump pulses with a frequency ($v_2$) through a second optical circulator and the fan-out device into the second core, wherein Brillouin backscattering light from the second core with a frequency ($v_2 - v_{B2}$) outputted by the second local circulator is mixed by a second optical coupler with a continuous wave light with a fixed frequency ($v_{2L} \approx v_2 - v_{B2}$) generated by a second local oscillator, where a mixed optical signal from the second optical coupler is detected by a second optical coherent receiver, and where an electrical output from the second optical coherent receiver is analyzed by a second electrical signal processor which outputs either (i) a second Brillouin frequency shift (BFS) baseline measurement ($v_{B2}$) which is obtained prior to deployment of the fiber when the fiber has no bend applied thereto, or (ii) a second BFS bend measurement ($v'_{B2}$) which is obtained after the deployment of the fiber and there is a bend applied to the fiber;

a third BOTDR Brillouin backscattering sensing mechanism comprising a third pump laser which launches pump pulses with a frequency ($v_3$) through a third optical circulator and the fan-out device into the third core, wherein Brillouin backscattering light from the third core with a frequency ($v_3 - v_{B3}$) outputted by the third local circulator is mixed by a third optical coupler with a continuous wave light with a fixed frequency ($v_{3L} \approx v_{13} - v_{B3}$) generated by a third local oscillator, where a mixed optical signal from the third optical coupler is detected by a third optical coherent receiver, and where an electrical output from the third optical coherent receiver is analyzed by a third electrical signal processor which outputs either (i) a third Brillouin frequency shift (BFS) baseline measurement ($v_{B3}$) which is obtained prior to deployment of the fiber when the fiber has no bend applied thereto, or (ii) a third BFS bend measurement ($v'_{B3}$) which is obtained after the deployment of the fiber and there is a bend applied to the fiber; and, a fourth BOTDR Brillouin backscattering sensing mechanism comprising a fourth pump laser which launches pump pulses with a frequency ($v_4$) through a fourth optical circulator and the fan-out device into the fourth core, wherein Brillouin backscattering light from the fourth core with a frequency ($v_4 - v_{B4}$) outputted by the fourth local circulator is mixed by a fourth optical coupler with a continuous wave light with a fixed frequency ($v_{4L} \approx v_4 - v_{B4}$) generated by a fourth local oscillator, where a mixed optical signal from the fourth optical coupler is detected by a fourth optical coherent receiver, and where an electrical output from the fourth optical coherent receiver is analyzed by a fourth electrical signal processor which outputs either (i) a fourth Brillouin frequency shift (BFS) baseline measurement ($v_{B4}$) which is obtained prior to deployment of the fiber when the fiber has no bend applied thereto, or (ii) a fourth BFS bend measurement ($v'_{B4}$) which is obtained after the deployment of the fiber and there is a bend applied to the fiber.

19. The method of claim 12, wherein the Brillouin backscattering sensing mechanism is a Brillouin Optical Domain Reflectometry (BOTDR) Brillouin backscattering sensing mechanism comprising:

a first BOTDR Brillouin backscattering sensing mechanism comprising a first laser which launches a continuous wave light with a frequency ($v_{1L}$) to a first optical coupler that splits the continuous wave light into two parts, where a first optical intensity modulator converts the one part of the continuous wave light into pump pulses with a frequency ($v_1$) which are introduced by a first optical circulator and a fan-out device into the first core, where a first frequency shifter shifts the frequency ($v_{1L}$) of the other part of the continuous wave light to a fixed frequency ($v_{1L} \approx v_1 - v_{B1}$), wherein Brillouin backscattering light from the first core with a frequency ($v_1 - v_{B1}$) is mixed by a first optical coupler with the shifted continuous wave light with the fixed frequency ($v_{1L} \approx v_1 - v_{B1}$) provided by the first frequency shifter, where a mixed optical signal from the first optical coupler is detected by a first optical coherent receiver, and wherein an electrical output from the first optical coherent receiver is analyzed by a first electrical signal processor which outputs either (i) a first BFS baseline measurement $v_{B1}$ which is obtained prior to deployment of the fiber when the fiber has no bend applied thereto, or (ii) a first BFS bend measurement $v'_{B1}$ which is obtained after the deployment of the fiber and there is a bend applied to the fiber;

a second BOTDR Brillouin backscattering sensing mechanism comprising a second laser which launches a continuous wave light with a frequency ($v_{2L}$) to a second optical coupler that splits the continuous wave light into two parts, where a second optical intensity modulator converts the one part of the continuous wave light into pump pulses with a frequency ($v_2$) which are introduced by a second optical circulator and the fan-out device into the second core, where a second frequency shifter shifts the frequency ($v_{2L}$) of the other part of the continuous wave light to a fixed frequency ($v_{2L} \approx v_2 - v_{B2}$), wherein Brillouin backscattering light from the second core with a frequency ($v_2 - v_{B2}$) is mixed by a second optical coupler with the shifted continuous wave light with the fixed frequency ($v_{2L} \approx v_2 - v_{B2}$) provided by the second frequency shifter, where a mixed optical signal from the second optical coupler is detected by a second optical coherent receiver, and wherein an electrical output from the second optical coherent receiver is analyzed by a second electrical signal processor which outputs either (i) a second BFS baseline measurement $v_{B2}$ which is obtained prior to deployment of the fiber when the fiber has no bend applied thereto, or (ii) a second BFS bend measurement $v'_{B2}$ which is obtained after the deployment of the fiber and there is a bend applied to the fiber;

a third BOTDR Brillouin backscattering sensing mechanism comprising a third laser which launches a continuous wave light with a frequency ($v_{3L}$) to a third optical coupler that splits the continuous wave light into two parts, where a third optical intensity modulator converts the one part of the continuous wave light into pump pulses with a frequency ($v_3$) which are introduced by a third optical circulator and the fan-out device into the third core, where a third frequency shifter shifts the frequency ($v_{3L}$) of the other part of the continuous wave light to a fixed frequency ($v_{3L} \approx v_3 - v_{B3}$), wherein Brillouin backscattering light from the third core with a frequency ($v_3-v_{B3}$) is mixed by a third optical coupler with the shifted continuous wave light with the fixed frequency ($v_{3L} \approx v_3 - v_{B3}$) provided by the third frequency shifter, where a mixed optical signal from the third optical coupler is detected by a third optical coherent receiver, and wherein an electrical output from the third optical coherent receiver is analyzed by a third electrical signal processor which outputs either (i) a third BFS baseline measurement $v_{B3}$ which is obtained prior to deployment of the fiber when the fiber has no bend applied thereto, or (ii) a third BFS bend measurement $v'_{B3}$ which is obtained after the deployment of the fiber and there is a bend applied to the fiber; and, a fourth BOTDR Brillouin backscattering sensing mechanism comprising a fourth laser which launches a continuous wave light with a frequency ($v_{4L}$) to a fourth optical coupler that splits the continuous wave light into two parts, where a fourth optical intensity modulator converts the one part of the continuous wave light into pump pulses with a frequency ($v_4$) which are introduced by a fourth optical circulator and the fan-out device into the fourth core, where a fourth frequency shifter shifts the frequency ($v_{4L}$) of the other part of the continuous wave light to a fixed frequency ($v_{4L} \approx -v_4 - v_{B4}$), wherein Brillouin backscattering light from the fourth core with a frequency ($v_4-v_{B4}$) is mixed by a fourth optical coupler with the shifted continuous wave light with the fixed frequency ($v_{4L} \approx -v_4 - v_{B4}$) provided by the fourth frequency shifter, where a mixed optical signal from the fourth optical coupler is detected by a fourth optical coherent receiver, and wherein an electrical output from the fourth optical coherent receiver is analyzed by a fourth electrical signal processor which outputs either (i) a fourth BFS baseline measurement $v_{B4}$ which is obtained prior to deployment of the fiber when the fiber has no bend applied thereto, or (ii) a fourth BFS bend measurement $v'_{B4}$ which is obtained after the deployment of the fiber and there is a bend applied to the fiber.

20. The method of claim 12, wherein the Brillouin backscattering sensing mechanism is a Brillouin Optical Domain Analysis (BOTDA) Brillouin backscattering sensing mechanism comprising:

a first BOTDA Brillouin backscattering sensing mechanism comprising a first pump laser and a first probe laser, wherein the first pump laser launches pump pulses with a frequency ($v_1$) through a first optical circulator and a first fan-out device into the first core, wherein the first probe laser launches a continuous wave light with a frequency ($v_{1L} \approx v_1 - v_{B1}$ (or $v_1 - v_{B2}$)) through the first fan-out device into the second core, wherein a second fan-out device couples the first core and the second core, wherein a probe signal is detected by a first photo detector that is coupled to the first optical circulator, and wherein an electrical signal output by the first photo detector is analyzed by a first electrical signal processor which outputs either (i) a first Brillouin frequency shift (BFS) baseline measurement $v_{B1}$ and a second BFS baseline measurement $v_{B2}$ which are obtained prior to deployment of the fiber when the fiber has no bend applied thereto, or (ii) a first BFS bend measurement $v'_{B1}$ and a second BFS bend measurement $v'_{B2}$ which are obtained after the deployment of the fiber and there is a bend applied to the fiber; and, a second BOTDA Brillouin backscattering sensing mechanism comprising a second pump laser and a second probe laser, wherein the second pump laser launches pump pulses with a frequency ($v_2$) through a second optical circulator and the first fan-out device into the third core, wherein the second probe laser launches a continuous wave light with a frequency ($v_{2L} \approx v_2 - v_{B3}$ (or $v_2 - v_{B4}$)) through the first fan-out device into the fourth core, wherein a probe signal is detected by a second photo detector that is coupled to the second optical circulator, and wherein an electrical signal output by the second photo detector is analyzed by a second electrical signal processor which outputs either (i) a third Brillouin BFS baseline measurement $v_{B3}$ and a fourth BFS baseline measurement $v_{B4}$ which are obtained prior to deployment of the fiber when the fiber has no bend applied thereto, or (ii) a third BFS bend measurement $v'_{B3}$ and a fourth BFS bend measurement $v'_{B4}$ which are obtained after the deployment of the fiber and there is a bend applied to the fiber.

21. The method of claim 12, wherein the Brillouin backscattering sensing mechanism is a Brillouin Optical Domain Analysis (BOTDA) Brillouin backscattering sensing mechanism comprising:

a first BOTDA Brillouin backscattering sensing mechanism comprising a first laser which launches a continuous wave light with a frequency ($v_{1L}$) to a first optical coupler that splits the continuous wave light into two parts, wherein a first optical modulator converts the one part of the continuous wave light into pump pulses with a frequency ($v_1$) which is introduced by a first optical circulator and a first fan-out device into the first core, wherein a first frequency shifter shifts the frequency ($v_{1L}$) of the other part of the continuous wave light to a frequency ($v_{1L} \approx v_1 - v_{B1}$ (or $v_1 - v_{B2}$)) where the shift continuous wave light is introduced by the first fan-out device into the second core, wherein a second fan-out device couples the first core and the second core, wherein a probe signal is detected by a first photo detector that is coupled to the first optical circulator, and wherein an electrical signal output by the first photo detector is analyzed by a first electrical signal processor which outputs either (i) a first Brillouin frequency shift (BFS) baseline measurement $v_{B1}$ and a second BFS baseline measurement $v_{B2}$ which are obtained prior to deployment of the fiber when the fiber has no bend applied thereto, or (ii) a first BFS bend measurement $v'_{B1}$ and a second BFS bend measurement $v'_{B2}$ which are obtained after the deployment of the fiber and there is a bend applied to the fiber; and, a second BOTDA Brillouin backscattering sensing mechanism comprising a second laser which launches a continuous wave light with a frequency ($v_{2L}$) to a second optical coupler that splits the continuous wave light into two parts, wherein a second optical modulator converts the one part of the continuous wave light into pump pulses with a frequency ($v_2$) which is introduced by a second optical circulator and the fan-out device into the third core, wherein a second frequency shifter shifts the frequency ($v_{2L}$) of the other part of the continuous wave light to a frequency ($v_{2L} \approx v_2 - v_{B3}$ (or $v_2 - v_{B4}$)) where the shift continuous wave light is introduced by the first fan-out device into the fourth core, wherein a probe signal is detected by a second photo detector that is coupled to the second optical circulator, and wherein an electrical signal output by the second photo detector is analyzed by a second electrical signal processor which outputs either (i) a third BFS baseline measurement $v_{B3}$ and a fourth BFS baseline measurement $v_{B4}$ which are obtained prior to deployment of the fiber when the fiber has no bend applied thereto, or (ii) a third BFS bend measurement $v'_{B3}$ and a fourth BFS bend measurement $v'_{B4}$ which are obtained after the deployment of the fiber and there is a bend applied to the fiber.

* * * * *

UNITED STATES PATENT AND TRADEMARK OFFICE
CERTIFICATE OF CORRECTION

PATENT NO. : 10,145,681 B2
APPLICATION NO. : 15/646820
DATED : December 4, 2018
INVENTOR(S) : Kevin Wallace Bennett et al.

Page 1 of 1

It is certified that error appears in the above-identified patent and that said Letters Patent is hereby corrected as shown below:

On the Title Page

On page 2, Column 2, item (56), other publications, Line 23, delete "multcore" and insert -- multicore --, therefor.

On page 2, Column 2, item (56), other publications, Line 37, delete "Jounral" and insert -- Journal --, therefor.

In the Claims

In Column 17, Line 65, Claim 4, delete "$K_{T4}66$" and insert -- $K_{T4}\Delta T$ --, therefor.

In Column 19, Line 9, Claim 8, delete "(BPS)" and insert -- (BFS) --, therefor.

In Column 20, Line 21, Claim 9, delete "(v $_{1L}$" and insert -- ($v_{1L}$ --, therefor.

In Column 21, Line 33, Claim 9, delete "($v_{4L}$-$v_{B4}$)" and insert -- ($V_4$-$v_{B4}$) --, therefor.

In Column 23, Line 47, Claim 12, delete "βalong" and insert -- β along --, therefor.

In Column 23, Line 65, Claim 14, delete "$\Delta v_{B4}=K_{\varepsilon 4}\Delta\varepsilon_4=K_{T4}\Delta T=K_{T4}\Delta T$" and insert -- $\Delta v_{B4} = K_{\varepsilon 4}\Delta\varepsilon_4 + K_{T4}\Delta T = K_{T4}\Delta T$ --, therefor.

In Column 27, Line 64, Claim 20, delete "measurement$v_{B2}$" and insert -- measurement $v_{B2}$ --, therefor.

Signed and Sealed this
Twenty-third Day of June, 2020

Andrei Iancu
*Director of the United States Patent and Trademark Office*